United States Patent
Akiyama

(10) Patent No.: US 9,350,455 B2
(45) Date of Patent: May 24, 2016

(54) OPTICAL TRANSMITTER AND BIAS CONTROL METHOD OF OPTICAL MODULATOR

(71) Applicant: FUJITSU LIMITED, Kawasaki-shi, Kanagawa (JP)

(72) Inventor: Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/338,763

(22) Filed: Jul. 23, 2014

(65) Prior Publication Data

US 2014/0334829 A1    Nov. 13, 2014

Related U.S. Application Data

(63) Continuation of application No. PCT/JP2012/052561, filed on Feb. 3, 2012.

(51) Int. Cl.
| | |
|---|---|
| H04B 10/04 | (2006.01) |
| H04B 10/54 | (2013.01) |
| G02F 1/01 | (2006.01) |
| H04B 10/50 | (2013.01) |

(52) U.S. Cl.
CPC .............. *H04B 10/54* (2013.01); *G02F 1/0123* (2013.01); *H04B 10/5053* (2013.01); *H04B 10/50575* (2013.01)

(58) Field of Classification Search
CPC ..... H04B 10/54; H04B 10/505; H04B 10/548
See application file for complete search history.

(56) References Cited

U.S. PATENT DOCUMENTS

| 6,278,539 B1 | 8/2001 | Ooi et al. |
| 2001/0007508 A1* | 7/2001 | Ooi .................. G02F 1/0123 359/245 |
| 2005/0105917 A1* | 5/2005 | Narusawa .......... H04B 10/58 398/183 |

(Continued)

FOREIGN PATENT DOCUMENTS

| JP | 2000-162563 | 6/2000 |
| JP | 2005-148329 | 6/2005 |
| JP | 2010-243953 | 10/2010 |

(Continued)

OTHER PUBLICATIONS

International Search Report of PCT/JP2012/052561 mailed on Mar. 6, 2012.

(Continued)

*Primary Examiner* — Dzung Tran
(74) *Attorney, Agent, or Firm* — Fujitsu Patent Center

(57) ABSTRACT

An optical transmitter includes: a drive signal generator configured to generate a drive signal from input data; an optical modulator configured to generate an optical signal corresponding to the drive signal; a superimposer configured to superimpose a first reference signal on the drive signal and superimpose a second reference signal on a bias voltage of the optical modulator; a detector configured to detect the first reference signal and the second reference signal included in the optical signal, and generate a first monitor signal indicating intensity and a phase of the detected first reference signal and a second monitor signal indicating intensity and a phase of the detected second reference signal; and a controller configured to control the bias voltage of the optical modulator in a control scheme determined based on the first monitor signal and the second monitor signal.

12 Claims, 18 Drawing Sheets

(56) References Cited

U.S. PATENT DOCUMENTS

2011/0044702 A1* 2/2011 Mizuguchi ......... H04B 10/5053
 398/184
2012/0288284 A1* 11/2012 Yoshida ............. H04B 10/5053
 398/186

FOREIGN PATENT DOCUMENTS

| | | |
|---|---|---|
| JP | 2011-232553 | 11/2011 |
| WO | 2009-078435 | 6/2009 |

OTHER PUBLICATIONS

Notification of Transmittal of Translation of The International Preliminary Report on Patentability (Form PCT/IB/338, PCT/IB/373 & Form PCT/ISA/237), PCT/JP2012/052561, 5 pages, dated Aug. 14, 2014.

JPOA—Office Action of Japanese Patent Application No. 2013-556179 dated Aug. 18, 2015, with English translation of relevant part, p. 1, line 34 through p. 3, line 8 of the Office Action.

* cited by examiner

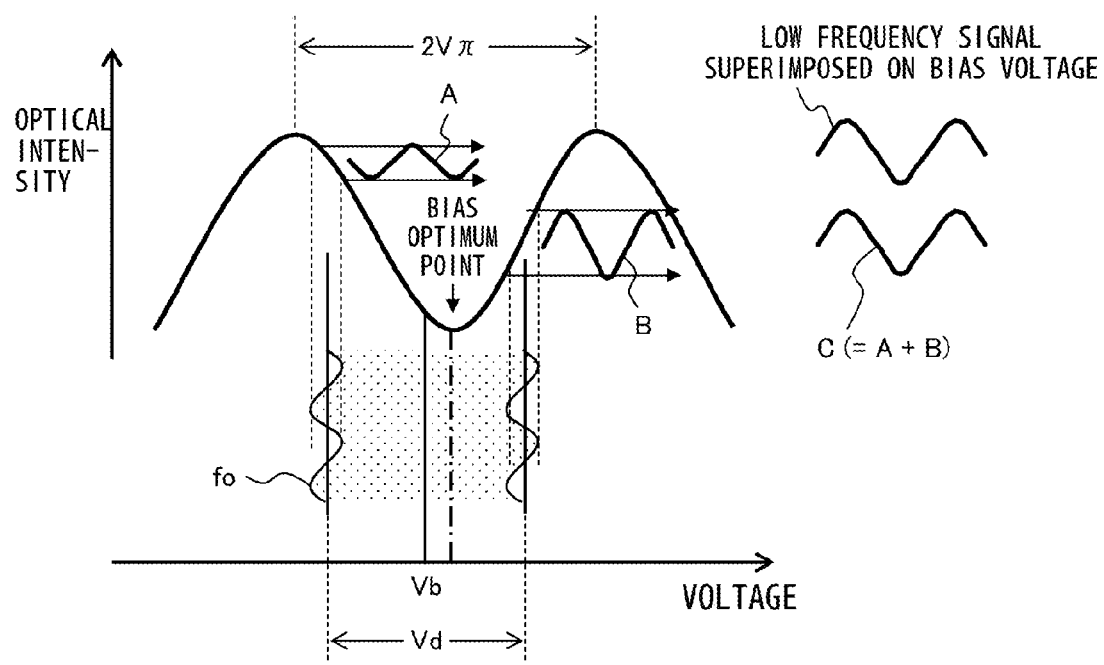
F I G. 4

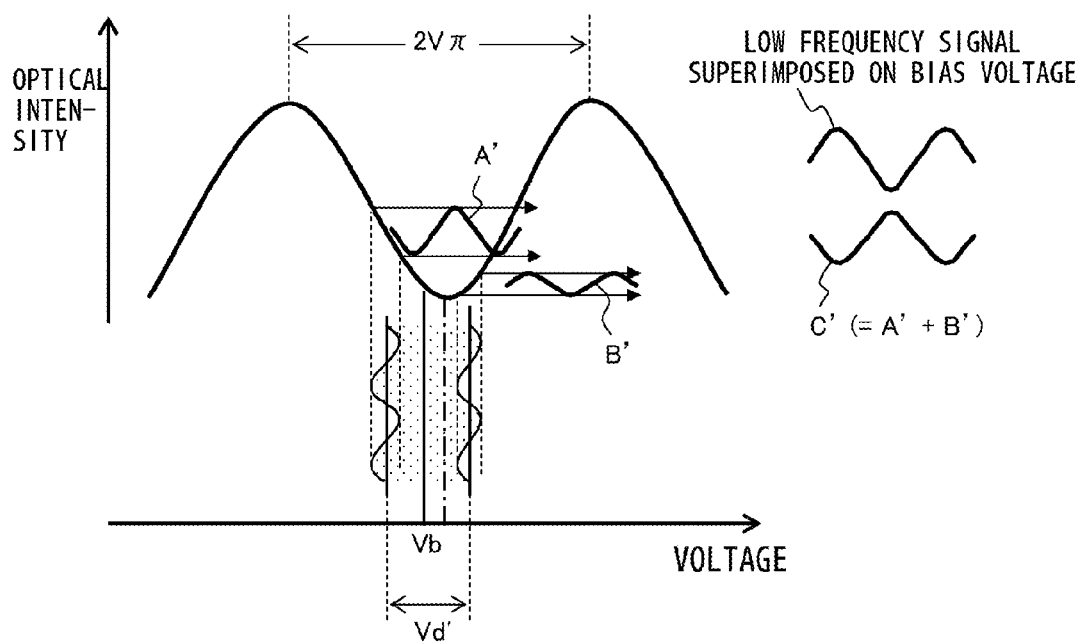
F I G. 5

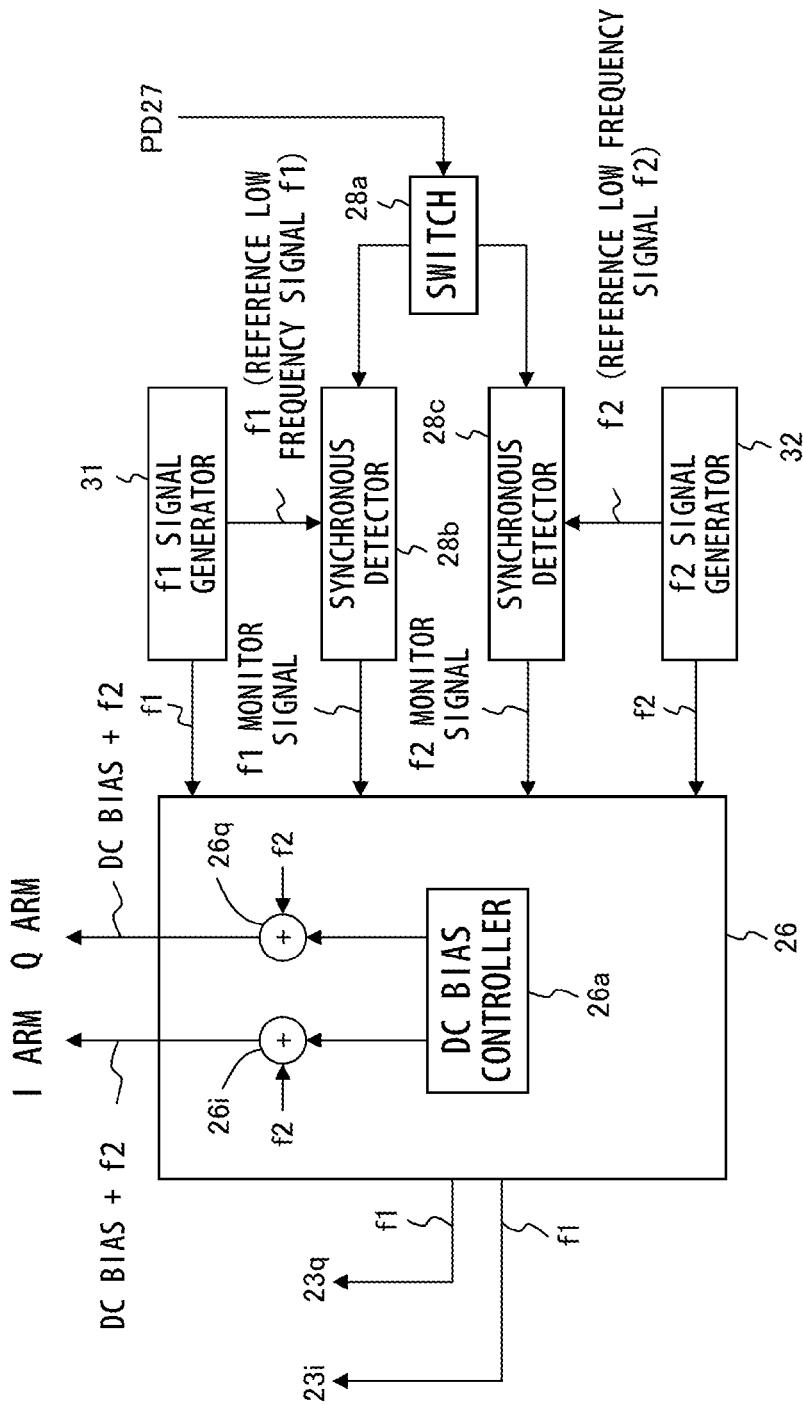
F I G. 7

⇒BIAS SWEEPING DIRECTION⇒

| DRIVE AMPLITUDE Vd | | SIGN OF MONITOR SIGNAL | | |
|---|---|---|---|---|
| $Vd < V\pi$ | f1 | + | + | + |
| (○ IN FIG. 8B) | f2 | + | 0 | − |
| $Vd = V\pi$ | f1 | + | + | + |
| | f2 | 0 | 0 | 0 |
| $V\pi < Vd < 2V\pi$ | f1 | + | + | + |
| (● IN FIG. 8A) | f2 | − | 0 | + |

F I G. 9 A

⇒BIAS SWEEPING DIRECTION⇒

| DRIVE AMPLITUDE Vd | | SIGN OF MONITOR SIGNAL | | |
|---|---|---|---|---|
| $Vd < V\pi$ | f1 | − | − | − |
| (△ IN FIG. 8B) | f2 | − | 0 | + |
| $Vd = V\pi$ | f1 | − | − | − |
| | f2 | 0 | 0 | 0 |
| $V\pi < Vd < 2V\pi$ | f1 | − | − | − |
| (▲ IN FIG. 8A) | f2 | + | 0 | − |

F I G. 9 B

| BIAS VOLTAGE ($V\pi$) | f1 MONITOR SIGNAL (f1 COMPONENT) | f2 MONITOR SIGNAL (f2 COMPONENT) |
|---|---|---|
| . | . | . |
| . | . | . |
| . | . | . |
| 0.40 | +0.95 | −0.39 |
| 0.45 | +0.97 | −0.27 |
| 0.50 | +0.99 | −0.10 |
| 0.55 | +0.98 | +0.09 |
| 0.60 | +0.96 | +0.25 |
| 0.65 | +0.94 | +0.38 |
| . | . | . |
| . | . | . |
| . | . | . |

FIG. 12

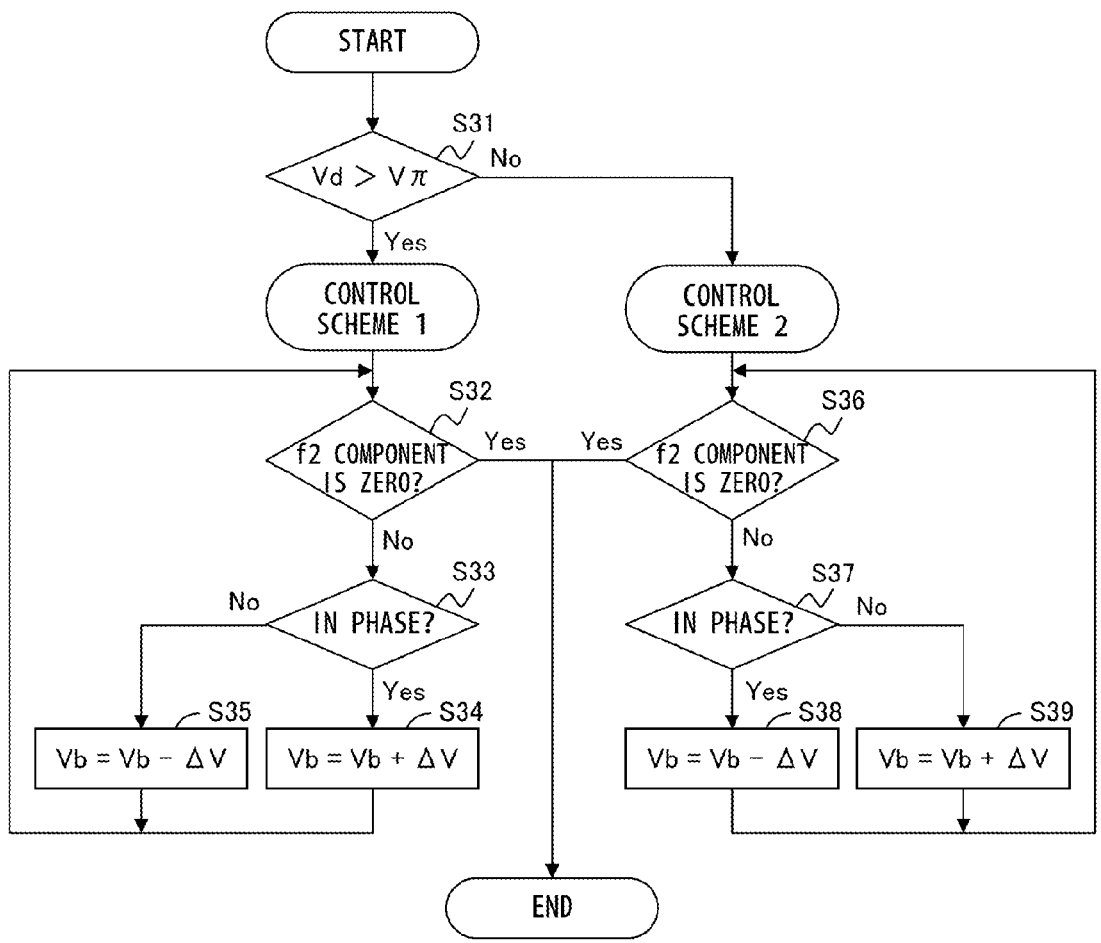
F I G. 1 3

⇒BIAS SWEEPING DIRECTION⇒

| DRIVE AMPLITUDE Vd | | SIGN OF MONITOR SIGNAL | | |
|---|---|---|---|---|
| $Vd < V\pi$ (○ IN FIG. 8B) | f1 | + | + | + |
| | f2 | + | 0 | − |
| | f1∗f2 | + | 0 | − |
| $Vd = V\pi$ | f1 | + | + | + |
| | f2 | 0 | 0 | 0 |
| | f1∗f2 | 0 | 0 | 0 |
| $V\pi < Vd < 2V\pi$ (● IN FIG. 8A) | f1 | + | + | + |
| | f2 | − | 0 | + |
| | f1∗f2 | − | 0 | + |

F I G. 1 4 A

⇒BIAS SWEEPING DIRECTION⇒

| DRIVE AMPLITUDE Vd | | SIGN OF MONITOR SIGNAL | | |
|---|---|---|---|---|
| $Vd < V\pi$ (△ IN FIG. 8B) | f1 | − | − | − |
| | f2 | − | 0 | + |
| | f1∗f2 | + | 0 | − |
| $Vd = V\pi$ | f1 | − | − | − |
| | f2 | 0 | 0 | 0 |
| | f1∗f2 | 0 | 0 | 0 |
| $V\pi < Vd < 2V\pi$ (▲ IN FIG. 8A) | f1 | − | − | − |
| | f2 | + | 0 | − |
| | f1∗f2 | − | 0 | + |

F I G. 1 4 B

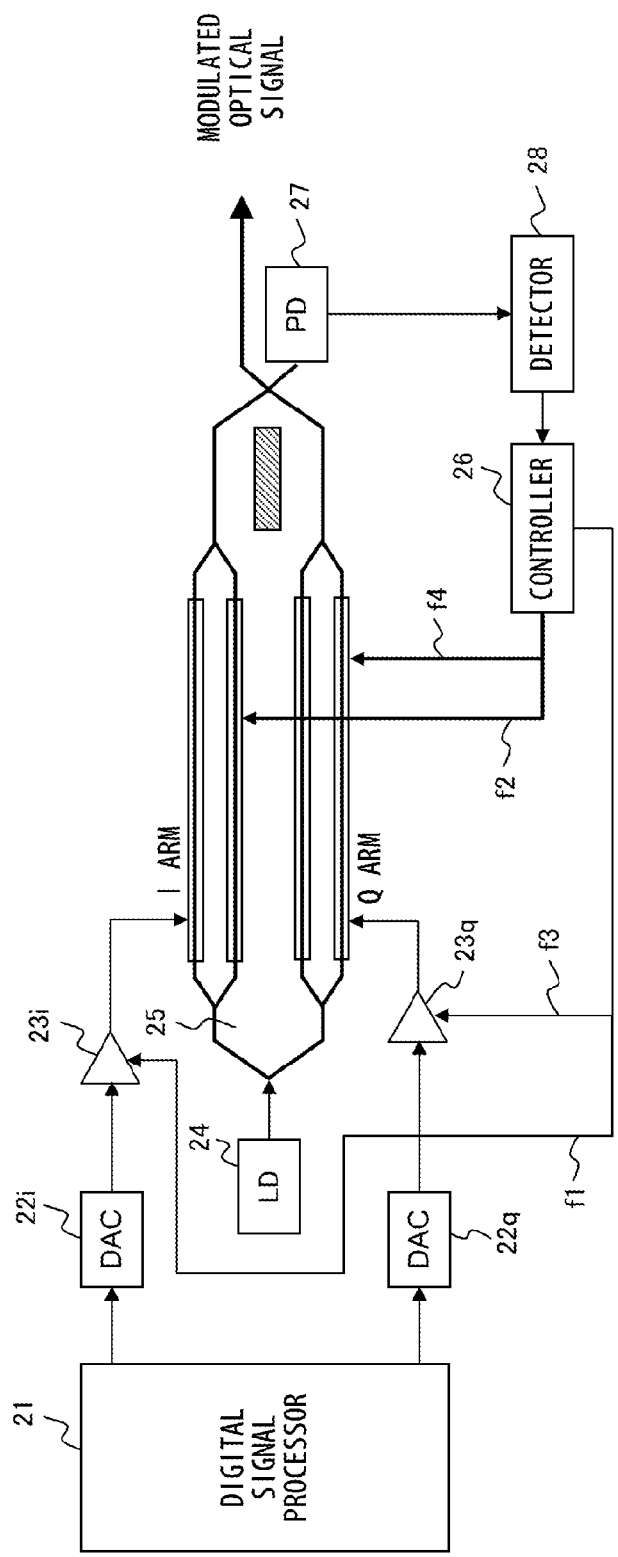
F I G. 16

OPTICAL TRANSMITTER AND BIAS CONTROL METHOD OF OPTICAL MODULATOR

CROSS-REFERENCE TO RELATED APPLICATIONS

This application is a continuation application of International Application PCT/JP2012/052561 filed on Feb. 3, 2012 and designated the U.S., the entire contents of which are incorporated herein by reference.

FIELD

The embodiments discussed herein are related to an optical transmitter and a bias control method of an optical modulator in the optical transmitter.

BACKGROUND

To realize a long-distance and large-capacity communication system in the next generation, the technology of generating a transmission signal using digital signal processing in an optical transmitter has been studied and developed. For example, a desired optical signal waveform of a dispersion pre-equalized signal, a modulated signal, etc. may be generated using the digital signal processing.

FIG. 1 illustrates an example of an optical transmitter. The optical transmitter illustrated in FIG. 1 includes a light source (LD) 11 and an optical modulator 12. The optical modulator 12 is a Mach-Zehnder LN modulator, and has I and Q arms. Furthermore, the optical modulator 12 has a phase shifter for providing a phase difference $\pi/2$ between the I and Q arms.

The continuous wave (CW) light generated by the light source 11 is branched by an optical splitter, and guided to the I and Q arms of the optical modulator 12. Data signals I and Q are provided respectively for the I and Q arms of the optical modulator 12. The amplitude of the data signals I and Q is, for example, $2V\pi$. $V\pi$ is a voltage (that is, a half-wave voltage) corresponding to a half period of the optical intensity/drive voltage characteristics. In the I arm, the continuous wave light is modulated by the data signal I to generate an I arm modulated optical signal. Similarly, in the Q arm, the continuous wave light is modulated by the data signal Q to generate a Q arm modulated optical signal. Then a QPSK modulated optical signal is generated by combining the I arm modulated optical signal and the Q arm modulated optical signal.

To generate a high quality optical signal in the above-mentioned optical transmitter, the respective bias voltages of the I and Q arms are appropriately controlled. Thus, the optical transmitter further includes a controller 13, a photo detector (PD) 14, and a detector 15 to control the bias voltage of the optical modulator 12.

The controller 13 superimposes a low frequency signal on the bias voltage of the optical modulator 12. Hereafter, f0 refers to the frequency of the low frequency signal. The modulated optical signal output from the optical modulator 12 includes the frequency component (that is, f0 component) of the low frequency signal. The photo detector 14 converts the modulated optical signal output from the optical modulator 12 into an electric signal. The detector 15 detects the intensity and the phase of the f0 component included in the modulated optical signal based on the electric signal generated by the photo detector 14. Then, the controller 13 performs the feedback control on the bias voltage of the I and Q arms so that the f0 component included in the modulated optical signal may approach zero. As a result, the bias voltages of the I and Q arms are optimized to generate a high quality optical signal. Note that the above-mentioned feedback control may be referred to as automatic bias control (ABC).

The method of controlling the bias of the optical modulator using a low frequency signal in the optical transmitter is described in, for example, Japanese Laid-open Patent Publication No. 2000-162563.

The amplitude of the drive signals (data signals I and Q in FIG. 1) of an optical transmitter may be changed by temperature or aging. However, the change of the amplitude of a drive signal by temperature or aging is small. Therefore, in the conventional optical transmitter, the amplitude of a drive signal is substantially constant during the operation of a communication system.

However, in the optical transmitter which generates a transmission signal using the digital signal processing, the modulation format and/or the amount of pre-equalization may be changed during the operation of a communication system. When the modulation format and/or the amount of pre-equalization is changed, the amplitude of a drive signal of optical modulation may be changed.

For example, FIG. 2A illustrates the waveform of a drive signal when the optical transmitter performs QPSK modulation, and FIG. 2B illustrates the waveform of a drive signal when the optical transmitter performs 16QAM modulation. In this example, the amplitude of a drive signal is about $2V\pi$ for QPSK. The amplitude of a drive signal is about $0.6V\pi$ for 16QAM. As illustrated, when the modulation format is changed, the amplitude of the drive signal is also changed.

FIG. 2C illustrates the waveform of a drive signal when the optical transmitter performs the QPSK modulation, and performs pre-equalization. In this case, the amplitude of the drive signal is smaller than $V\pi$. The pre-equalization is realized by applying a distortion to a signal waveform in a transmitter so that the chromatic dispersion of an optical transmission line between a transmitter and a receiver may be compensated. Furthermore, the pre-equalization may be realized by the digital signal processing.

As described above, with the recent or future optical transmitter, the driving condition (the amplitude of a drive signal in the example above) of an optical modulator may be greatly changed depending on the change of a modulation format etc. If the driving condition is changed, there may be the case in which the bias of an optical modulator is not appropriately controlled, and an optical transmitter does not generate a high quality optical signal.

SUMMARY

According to an aspect of the embodiments, an optical transmitter includes: a drive signal generator configured to generate a drive signal from input data; an optical modulator configured to generate an optical signal corresponding to the drive signal, intensity of output light of the optical modulator periodically changing with respect to an applied voltage; a superimposer configured to superimpose a first reference signal on the drive signal and superimpose a second reference signal on a bias voltage of the optical modulator; a detector configured to detect the first reference signal and the second reference signal included in the optical signal, and generate a first monitor signal indicating intensity and a phase of the detected first reference signal and a second monitor signal indicating intensity and a phase of the detected second reference signal; and a controller configured to control the bias voltage of the optical modulator in a control scheme determined based on the first monitor signal and the second monitor signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of the bias control of an optical transmitter (when Vd>Vπ);

FIG. 5 is an explanatory view of the bias control of an optical transmitter (when Vd'<Vπ);

FIG. 7 illustrates an embodiment of a controller and a detector;

FIGS. 9A and 9B are tables representing a state of a monitor signal with respect to bias voltage;

FIG. 12 illustrates an example of a monitor signal data memory;

FIG. 13 is a flowchart of a process for controlling the bias voltage of an optical modulator;

FIGS. 14A and 14B are tables representing a state of a monitor signal used in a case in which drive amplitude is decided in another method;

FIG. 16 illustrates a configuration that can simultaneously determine the control schemes of I and Q arms;

DESCRIPTION OF EMBODIMENTS

Figure 3:
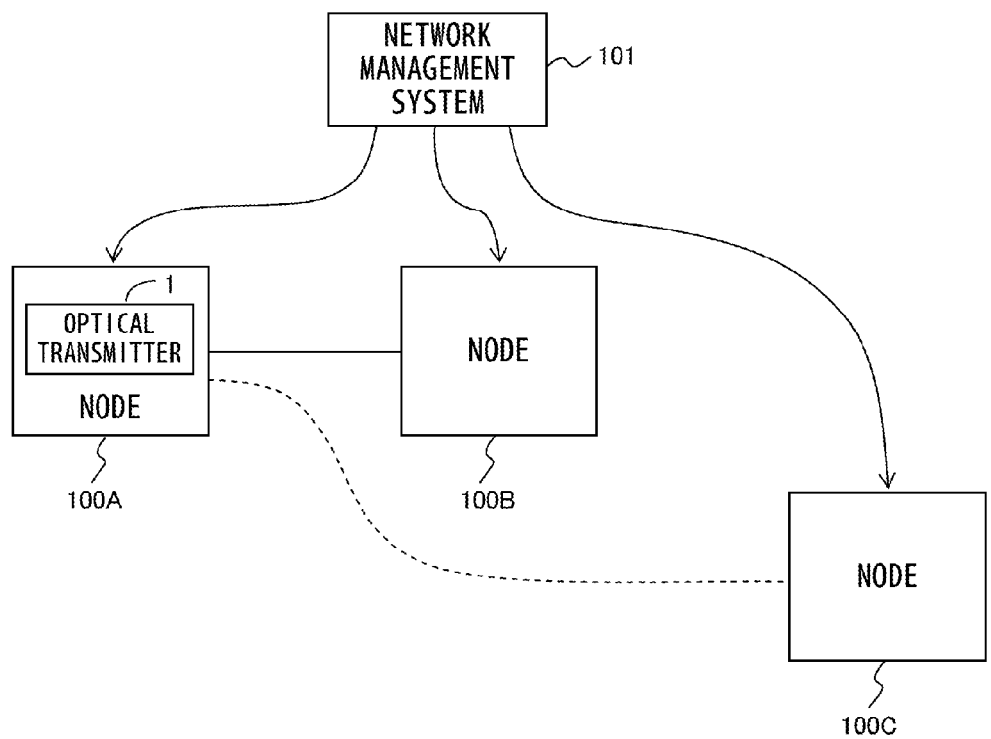
FIG. 3 illustrates an example of a communication system in which an optical transmitter according to an embodiment of the present invention is used.

FIG. 3 illustrates an example of a communication system in which an optical transmitter according to an embodiment of the present invention is used. The communication system illustrated in FIG. 3 includes a plurality of optical nodes 100A-100C and a network management system 101.

A optical transmitter 1 according to an embodiment of the present invention is provided in the optical node 100A in FIG. 3. However, the optical nodes 100B and 100C respectively include similar optical transmitters. Each of the optical nodes 100A-100C includes an optical receiver which receives an optical signal. Each of the optical nodes 100A-100C may transmit an optical signal to another optical node through an optical fiber.

The network management system 101 manages a communication system, and provides an instruction and control information for the optical nodes 100A-100C. For example, the network management system 101 may specify a modulation format for a source node and a destination node of transmission data. The modulation format is selected from among, for example, BPSK, QPSK, 16QAM, 256QAM, etc. The network management system 101 may notify the source node of the amount of chromatic dispersion of an optical transmission line according to the transmission distance of an optical signal.

The optical transmitter 1 generates an optical signal according to an instruction and/or control information received from the network management system 101. For example, the optical transmitter 1 generates a drive signal from a data signal in the modulation format specified by the network management system 101. The optical transmitter 1 may also generate a pre-equalized drive signal according to the amount of chromatic dispersion specified by the network management system 101. The optical modulator of the optical transmitter 1 generates a modulated optical signal by the drive signal generated as described above.

Thus, in the example illustrated in FIG. 3, the optical transmitter 1 generates a drive signal of an optical modulator according to the instruction and/or control information received from the network management system 101. That is, in the optical transmitter 1, the drive condition (the amplitude of a drive signal in this example) of the optical modulator may be changed according to the instruction and/or the control information received from the network management system 101.

Figure 1:
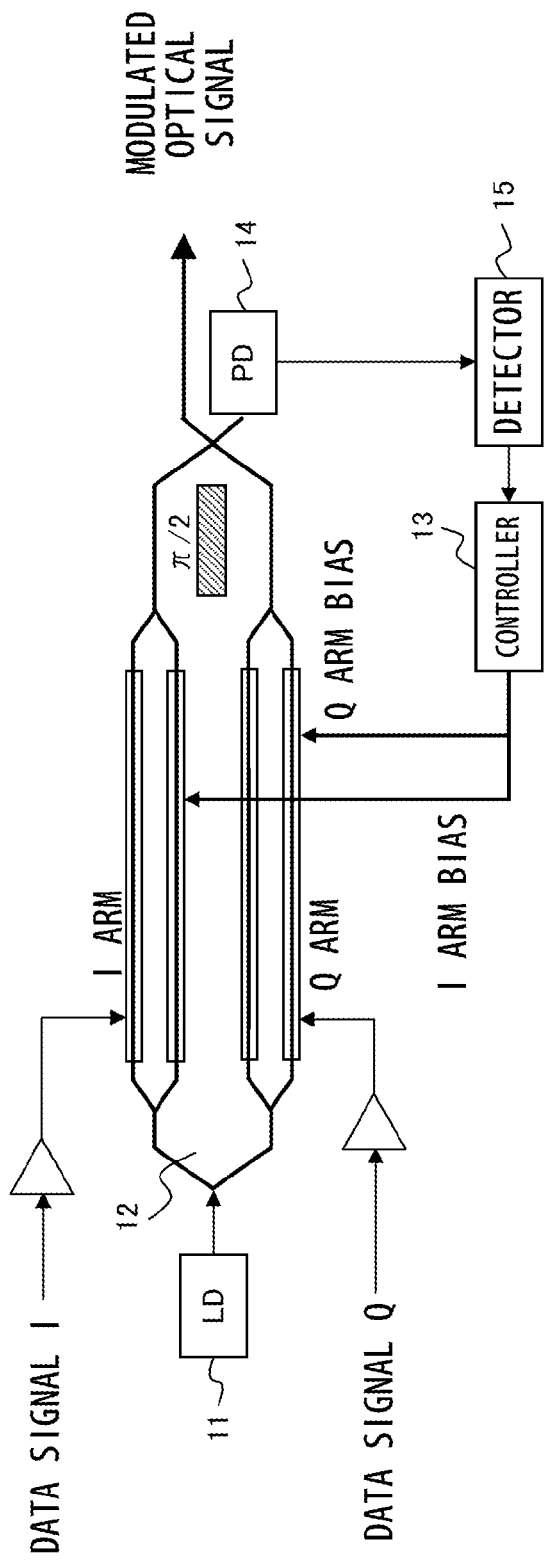
FIG. 1 illustrates an example of an optical transmitter.

Described next is the bias control of an optical modulator. The optical transmitter 1 appropriately controls the bias voltage of an optical modulator to generate a high quality optical signal. The method of controlling the bias voltage of an optical modulator is described below with reference to the configuration illustrated in FIG. 1.

FIG. 4 is an explanatory view of the bias control when the drive amplitude Vd is larger than Vπ (Vd>Vπ). This operation state corresponds to, for example, the case in which an optical signal is generated by QPSK modulation illustrated in FIG. 2A. FIG. 5 is an explanatory view of the bias control when the drive amplitude Vd' is smaller than Vπ (Vd'<Vπ). This operation state corresponds to, for example, 16QAM modulation illustrated in FIG. 2B or the pre-equalization illustrated in FIG. 2C.

In FIGS. 4 and 5, it is assumed that the bias voltage Vb of the optical modulator is shifted to the low voltage side with respect to the optimum voltage. The low frequency signal f0 is superimposed on the bias voltage Vb.

When Vd>Vπ, the f0 component A is generated at one edge of the drive signal, and the f0 component B is generated at the other edge of the drive signal as illustrated in FIG. 4. The f0 component A and the f0 component B are optical signal component of the frequency f0, and are included in the modulated optical signal. Therefore, the modulated optical signal includes the f0 component C (C=A+B).

In this example, the amplitude of the f0 component B is larger than the amplitude of the f0 component A. Therefore, the phase of the f0 component C is the same as the phase of the f0 component B. The f0 component B is generated in the area where the gradient of the optical intensity/drive voltage characteristics is positive. Therefore, in this example, the phase of the f0 component C detected from the modulated optical signal is the same as the phase of the low frequency signal superimposed on the bias voltage.

In this case, the bias voltage of the optical modulator is controlled in the control scheme 1 below.

<Control Scheme 1>
(1) When the phase of the f0 component C is the same as the phase of the low frequency signal superimposed on the bias voltage, the bias voltage is increased.
(2) When the phase of the f0 component C is the reversed phase of the low frequency signal superimposed on the bias voltage, the bias voltage is decreased.
(3) The intensity of the f0 component C is zero, the bias voltage is maintained. (Zero includes the state lower than a rather small threshold.)

When Vd' is smaller than Vπ (Vd'<Vπ), the f0 component A' is generated at one edge of the drive signal, and the f0 component B' is generated at the other edge of the drive signal as illustrated in FIG. 5. The f0 component A' and the f0 component B' are optical signal components of the frequency f0, and included in the modulated optical signal. Therefore, the modulated optical signal includes the f0 component C' (C'=A'+B').

In this example, the amplitude of the f0 component A' is larger than the amplitude of the f0 component B'. Therefore, the phase of the f0 component C' is the same as the phase of the f0 component A'. The f0 component A' is generated in the area where the gradient of the optical intensity/drive voltage characteristics is negative. Therefore, in this example, the phase of the f0 component C' detected from the modulated optical signal is the reversed phase of the low frequency signal superimposed on the bias voltage.

In this case, if the optical transmitter 1 uses the scheme 1 above, the bias voltage is not controlled to approach the optimum voltage. That is, in the scheme 1, when the phase of the f0 component C' is the reversed phase of the low frequency signal superimposed on the bias voltage as illustrated in FIG. 5, the bias voltage is reduced. That is, the bias voltage is controlled so that the error with respect to the optimum voltage may increase. As a result, the feedback control to optimize the bias voltage diverges.

Therefore, in the case illustrated in FIG. 5 (Vd'<Vπ), it is necessary to control the bias voltage in the scheme different from the control scheme 1. Concretely, in the case illustrated in FIG. 5, the bias voltage of the optical modulator is controlled in the control scheme 2 below.

<Control Scheme 2>
(1) When the phase of the f0 component C' is the same as the phase of the low frequency signal superimposed on the bias voltage, the bias voltage is decreased.
(2) When the phase of the f0 component C' is the reversed phase of the low frequency signal superimposed on the bias voltage, the bias voltage is increased.
(3) When the intensity of the f0 component C' is zero, the bias voltage is maintained. (Zero includes the state lower than a rather small threshold.)

In the optical transmitter 1 according to the present embodiment, the driving condition of the optical modulator (the amplitude of the drive signal in this example) may be changed according to the instruction and/or the control information received from the network management system 101 as described above. When the driving condition of the optical modulator is changed, it may be necessary to change the control scheme of controlling the bias voltage. Thus, the optical transmitter 1 detects the amplitude of the drive signal and selects a scheme of controlling the bias voltage based on the result of the detection.

Figure 6:
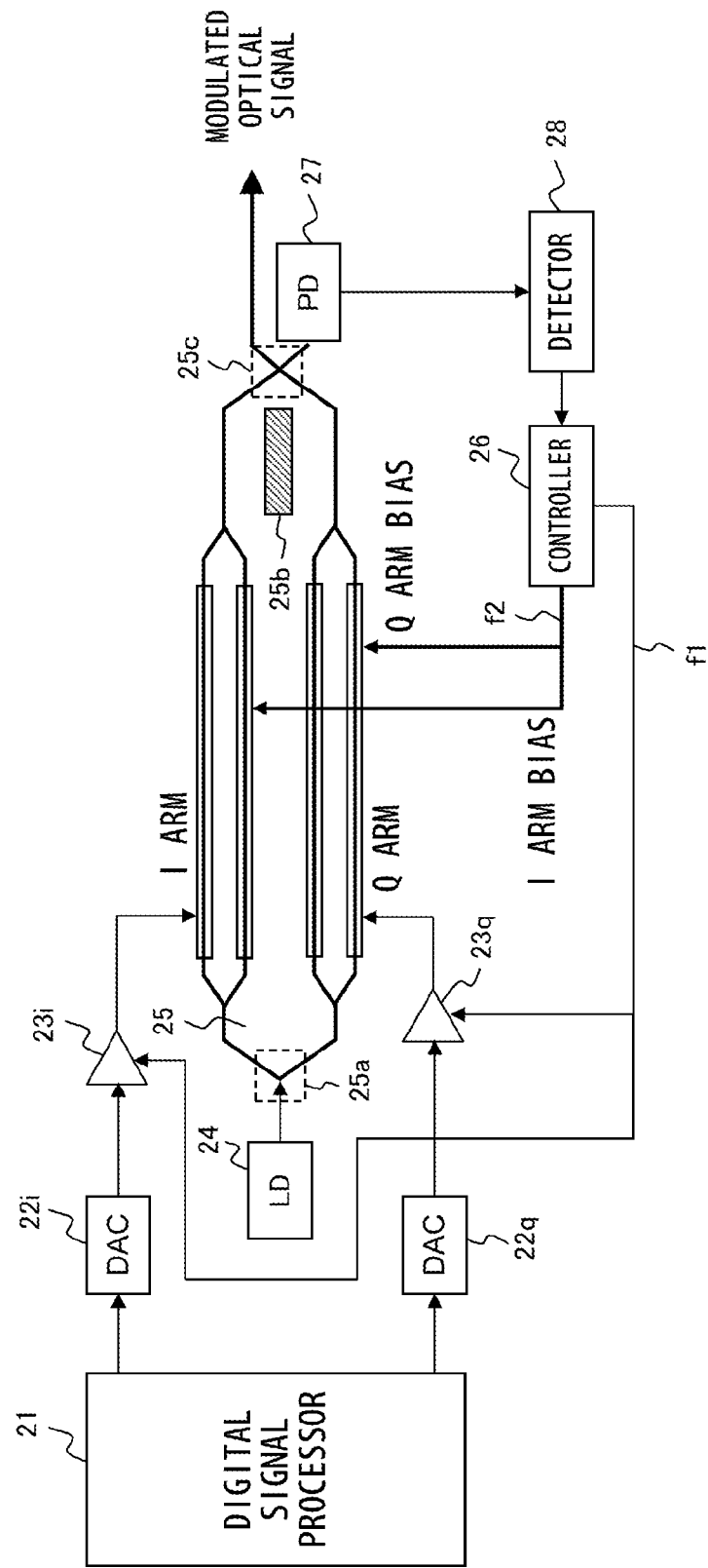
FIG. 6 illustrates a configuration of an optical transmitter according to an embodiment of the present invention.

FIG. 6 illustrates a configuration of the optical transmitter 1 according to an embodiment of the present invention. The optical transmitter 1 according to the embodiment includes, as illustrated in FIG. 6, a digital signal processor 21, D/A converters 22i and 22q, amplifiers 23i and 23q, a light source (LD) 24, an optical modulator 25, a controller 26, a photo detector 27, and a detector 28.

The digital signal processor 21 generates the data signals I and Q from the transmission data. The transmission data is generated in, for example, the application layer not illustrated in the attached drawings. Furthermore, the digital signal processor 21 generates the data signals I and Q from the transmission data according to the instruction and/or the control information received from the network management system 101. That is, the digital signal processor 21 generates the data signals I and Q by, for example, a specified modulation format. The data signals I and Q are used as the drive signals of the optical modulator 25. The digital signal processor 21 is implemented by using, for example, a processor and memory.

The D/A converters 22i and 22q respectively convert the data signals I and Q generated by the digital signal processor 21 into analog signals. The amplifiers 23i and 23q respectively amplify the data signals I and Q output from the D/A converters 22i and 22q. The data signals I and Q amplified by the amplifiers 23i and 23q are fed to the I and Q arms of the optical modulator 25, respectively. Each of the amplifiers 23i and 23q is an electric amplifier which amplifies an electric signal. In addition, each of the amplifiers 23i and 23q is equipped with a gain control terminal which receives a gain control signal.

The light source 24 is, for example, a laser device including a laser diode, and generates CW light. The CW light generated by the light source 24 is input to the optical modulator 25.

The optical modulator 25 is a modulator in which the power of output light is periodically changed depending on the drive voltage. In this embodiment, the optical modulator 25 is implemented by a Mach-Zehnder LN modulator. That is, the optical modulator 25 has optical intensity/voltage characteristics of periodically changing the intensity of the output light with respect to the applied voltage. Note that the optical modulator 25 includes an optical splitter 25a, an I arm, a Q arm, a phase shifter 25b, and an optical combiner 25c.

The optical splitter 25a branches and guides the input CW light to the I and Q arms. The I arm includes an I arm optical waveguide and an I arm signal electrode formed near the I arm optical waveguide. The refractive index (that is, an optical path length) of the I arm optical waveguide is changed depending on the voltage applied to the I arm signal electrode. Here, the data signal I is applied to the I arm signal electrode as the drive signal. Therefore, in the I arm, the CW light is modulated by the data signal I, and an optical signal I is generated.

In this example, the I arm has one set of optical waveguides. Each of the optical waveguides in the I arm may be provided with a corresponding signal electrode. In this case, although not specifically limited, the data signal I may be a differential signal.

The configuration of the Q arm is substantially the same as the configuration of the I arm. That is, the Q arm includes a Q arm optical waveguide and a Q arm signal electrode. However, a data signal Q is applied as a drive signal to the Q arm signal electrode. Therefore, in the Q arm, the CW light is modulated by the data signal Q, and an optical signal Q is generated.

The phase shifter 25b provides a phase difference π/2 between the I and Q arms. The phase shifter 25b is realized by an electrode for adjusting the optical path length of the I arm and/or the Q arm. In this case, the voltage applied to the electrode is controlled using the optical signal output from the optical modulator 25.

The optical combiner 25c combines the optical signal I generated by the I arm and the optical signal Q generated by the Q arm. Thus, the optical modulator 25 generates a modulated optical signal (for example, a QPSK modulated optical signal).

The controller 26 controls the bias voltage of the optical modulator 25. In this case, the controller 26 first determines the control scheme for optimizing the bias voltage. Then, the controller 26 optimizes the bias voltage in the determined control scheme. The controller 26 is implemented by using, for example, software. Otherwise, the controller 26 is implemented by software and hardware circuits. The operation of the software is realized by using a processor and memory.

When determining the bias control scheme, the controller 26 superimposes the low frequency signal f1 on the drive signal (data signal I, data signal Q), and superimposes the low frequency signal f2 on the bias voltage of the optical modulator 25. The low frequency signals f1 and f2 are not specifically restricted, but are, for example, sine wave signals. It is assumed that the frequency of the low frequency signals f1 and f2 is sufficiently lower than the bit rate or symbol rate of the data signal. For example, the frequency of the low frequency signals f1 and f2 are several kHz through several MHz. However, in this embodiment, the frequencies of the low frequency signals f1 and f2 are different from each other.

The low frequency signal f1 is provided for the gain control terminal of the amplifiers 23i and 23q in this embodiment. In this case, the low frequency signal f1 may be superimposed on a DC gain control signal, and applied to the gain control terminals of the amplifiers 23i and 23q. When the low frequency signal f1 is applied to the amplifiers 23i and 23q, the amplitude of the drive signal is oscillated by the frequency f1. That is, the low frequency signal f1 is superimposed on the drive signal. When the low frequency signal f1 is superimposed on the drive signal, the modulated optical signal generated by the optical modulator 25 includes the f1 component. Note that the controller 26, the amplifiers 23i and 23q are an example of a superimposer which superimposes the low frequency signal f1 on the drive signal.

The low frequency signal f2 is superimposed on the bias voltage of the optical modulator 25. In this case, the bias voltage on which the low frequency signal f2 is superimposed is applied to the optical modulator 25. Therefore, the modulated optical signal generated by the optical modulator 25 includes the f2 component.

The photo detector 27 converts the modulated optical signal generated by the optical modulator 25 into an electric signal. The photo detector 27 is realized by, for example, a photodiode. The photo detector 27 is provided, for example, on the output side of the optical modulator 25. In this case, the photo detector 27 converts the modulated optical signal output from the optical modulator 25 into an electric signal. When the optical modulator 25 includes a photo detector for monitoring a modulated optical signal, the photo detector may be used as the photo detector 27.

The detector 28 detects the f1 component and the f2 component included in the modulated optical signal according to the electric signal generated by the photo detector 27. The f1 component is a frequency component of the low frequency signal f1, and the f2 component is a frequency component of the low frequency signal f2. The detector 28 detects the intensity and the phase of each of the f1 component and the f2 component by, for example, synchronous detection. The detector 28 outputs an f1 monitor signal indicating the intensity and phase of the f1 component, and an f2 monitor signal indicating the intensity and phase of the f2 component.

The controller 26 determines the bias control scheme according to the f1 monitor signal and the f2 monitor signal. In this case, the controller 26 can detect the amplitude of the drive signal of the optical modulator 25 according to the f1 monitor signal and the f2 monitor signal. For example, the controller 26 can decide whether or not the amplitude of the drive signal of the optical modulator 25 is larger than $V\pi$. In this case, the controller 26 selects the above-mentioned control scheme 1 or scheme 2 as the bias control scheme.

Afterwards, the controller 26 controls the bias voltage of the optical modulator 25 in the determined control scheme. After determining the control scheme, it is preferable that the low frequency signal f1 is not superimposed on the drive signal.

Thus, the controller 26 determines the bias control scheme according to the low frequency signal f1 and the low frequency signal f2 included in the modulated optical signal. That is, the low frequency signal f1 and the low frequency signal f2 are used in determining a bias control scheme. Note that the low frequency signal f1 and the low frequency signal f2 are examples of a reference signal (first reference signal and second reference signal).

FIG. 7 illustrates an embodiment of the controller 26 and the detector 28. In FIG. 7, a f1 signal generator 31 generates the low frequency signal f1. A f2 signal generator 32 generates the low frequency signal f2. The f1 signal generator 31 and the f2 signal generator 32 may be included in the controller 26.

The detector 28 includes a switch 28a, a synchronous detector 28b, and a synchronous detector 28c. The switch 28a branches the electric signal output from the photo detector 27 and guides it to the synchronous detectors 28b and 28c. The electric signal output from the photo detector 27 indicates the modulated optical signal generated by the optical modulator 25.

The synchronous detector 28b performs synchronous detection using the low frequency signal f1 generated by the f1 signal generator 31. That is, the synchronous detector 28b detects the intensity and phase of the f1 component included in the modulated optical signal generated by the optical modulator 25. Then, the synchronous detector 28b outputs the f1 monitor signal indicating the intensity and phase of the f1 component. In the description below, the low frequency signal f1 applied from the f1 signal generator 31 to the synchronous detector 28b may be referred to as a reference low frequency signal f1.

The absolute value of the f1 monitor signal indicates the intensity of the detected f1 component. If the detected phase of the f1 component is the same (or substantially the same) as that of the reference low frequency signal f1, then the f1 monitor signal indicates a positive value. On the other hand, if the detected phase of the f1 component is reversed phase (or substantially reversed) of the reference low frequency signal f1, then the f1 monitor signal indicates a negative value.

Similarly, the synchronous detector 28c performs the synchronous detection using the low frequency signal f2 generated by the f2 signal generator 32. That is, the synchronous detector 28c detects the intensity and phase of the f2 component included in the modulated optical signal generated by the optical modulator 25. Then, the synchronous detector 28c outputs the f2 monitor signal indicating the intensity and phase of the f2 component. In the description below, the low frequency signal f2 applied from the f2 signal generator 32 to the synchronous detector 28c may be referred to as a reference low frequency signal f2.

The absolute value of the f2 monitor signal indicates the intensity of the detected f2 component. Furthermore, if the detected phase of the f2 component is the same (or substantially the same) as that of the reference low frequency signal f2, then the f2 monitor signal indicates a positive value. On the other hand, if the detected phase of the f2 component is the reversed phase (or substantially reversed) of the reference low frequency signal f2, then the f2 monitor signal indicates a negative value.

The controller 26 provides the low frequency signal f1 generated by the f1 signal generator 31 to the amplifiers 23$i$ and 23$q$. However, when the controller 26 determines the control scheme of the I arm of the optical modulator 25, it provides the low frequency signal f1 to the amplifier 23$i$. When the controller 26 determines the control scheme of the Q arm of the optical modulator 25, it provides the low frequency signal f1 to the amplifier 23$q$. The controller 26 may superimpose the low frequency signal f1 on the DC voltage signal to control the gain of the amplifiers 23$i$ and 23$q$.

The controller 26 includes a DC bias controller 26$a$, and adders 26$i$ and 26$q$. The DC bias controller 26$a$ generates a DC bias voltage signal for controlling the bias of the optical modulator 25. The DC bias voltage is controlled by a feedback system. However, when determining the control scheme of the I arm of the optical modulator 25, the DC bias controller 26$a$ sweeps the DC bias voltage to be applied to the I arm within a specified range. When determining the control scheme of the Q arm of the optical modulator 25, the DC bias controller 26$a$ sweeps the DC bias voltage to be applied to the Q arm within a specified range.

When the controller 26 determines the control scheme of the I arm, the adder 26$i$ superimposes the low frequency signal f2 to the DC bias voltage signal of the I arm. Similarly, when the controller 26 determines the control scheme of the Q arm, the adder 26$q$ superimposes the low frequency signal f2 on the DC bias voltage signal of the Q arm. When the controller 26 controls the bias of the optical modulator 25, the adders 26$i$ and 26$q$ may respectively superimpose the low frequency signal f2 on the corresponding DC bias voltage signal. Note that the adders 26$i$ and 26$q$ are an example of the superimposer for superimposing the low frequency signal f2 on the bias voltage.

Described next is the method of determining the bias control scheme of the optical modulator 25. In the embodiment, the controller 26 determines the control scheme of the I arm, and then determines the control scheme of the Q arm. However, the controller 26 may determine the control scheme of the Q arm, and then determine the control scheme of the I arm.

The method of determining the control scheme of the I arm and the method of determining the control scheme of the Q arm are substantially the same as each other. Therefore, described below is the method of determining the control scheme of the I arm.

When determining the control scheme of the I arm, the controller 26 provides the low frequency signal f1 to the amplifier 23$i$. That is, the low frequency signal f1 is superimposed on the data signal I used as a drive signal of the I arm. In addition, the controller 26 superimposes the low frequency signal f2 on the bias voltage of the I arm.

The controller 26 sweeps the bias voltage of the I arm in a specified range. The initial value of the sweep of a bias voltage is not specifically restricted, but may be, for example, zero. In the sweeping operation, the bias voltage gradually increases from the initial value. Furthermore, the range of the sweep of a bias voltage is not less than V$\pi$. However, it is preferable that the range of the sweep of a bias voltage is not less than 2V$\pi$. Furthermore, when the production variance of the optical intensity characteristics of the optical modulator 25 with respect to the bias voltage is considered, it is preferable that the sweep is performed over the 3V$\pi$. Note that V$\pi$ indicates a half-wave voltage of the optical modulator 25.

The controller 26 and the detector 28 detect the f1 component and the f2 component included in the modulated optical signal while sweeping the bias voltage of the I arm. The detected f1 component and f2 component are expressed by the f1 monitor signal and the f2 monitor signal. Then, the controller 26 decides whether or not the amplitude of the drive signal of the optical modulator 25 is larger than V$\pi$ using the f1 monitor signal and the f2 monitor signal.

Figure 8A:
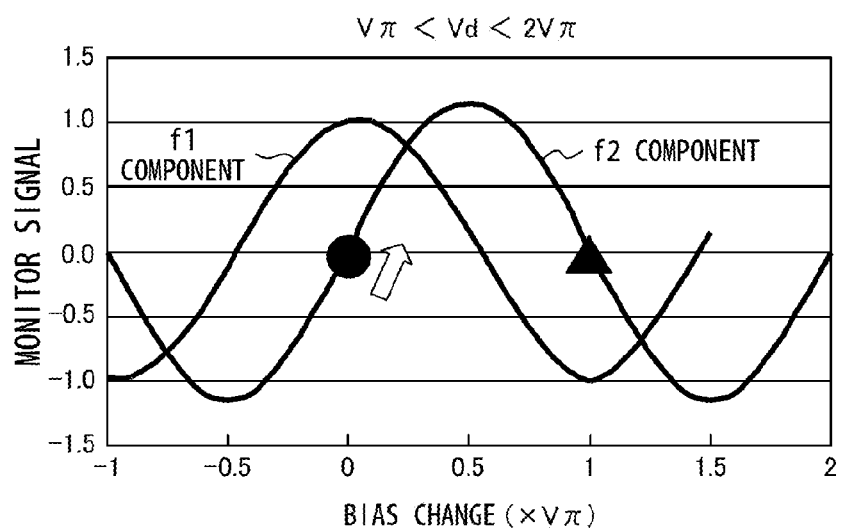
FIGS. 8A and 8B illustrate a monitor signal detected with respect to bias voltage.
Figure 8B:
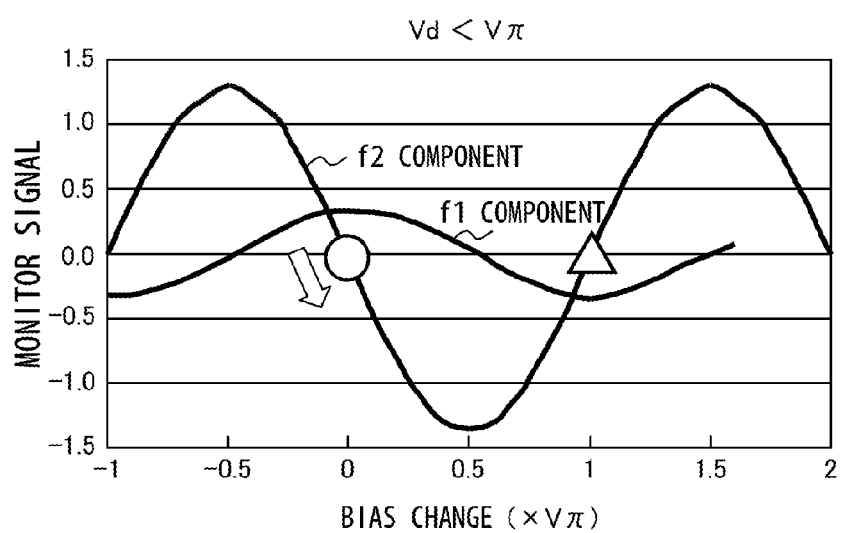

FIGS. 8A and 8B illustrate the f1 monitor signal and the f2 monitor signal detected while sweeping the bias voltage. FIG. 8A illustrates a monitor signal when the drive amplitude Vd satisfies V$\pi$<Vd<2V$\pi$. FIG. 8B illustrates a monitor signal when the drive amplitude Vd satisfies Vd<V$\pi$.

In FIGS. 8A and 8B, the horizontal axis indicates a bias voltage. In FIGS. 8A and 8B, the bias voltage is normalized by V$\pi$=1. The vertical axis indicates the monitor signal corresponding to the f1 component and the f2 component. The absolute value of the monitor signal indicates the intensity (power or amplitude) of the f1 component or the f2 component. The signs of a monitor signal indicate the phases of the f1 component and the f2 component.

Each monitor signal periodically changes with respect to the bias voltage as illustrated in FIGS. 8A and 8B. The period of the change of the monitor signal with respect to the bias voltage is 2V$\pi$. The change of the monitor signal with respect to the bias voltage is expressed substantially by a sine wave curve. The phases of two curves (f1 component and f2 component) are shifted by V$\pi$/2 from each other.

When V$\pi$<Vd<2V$\pi$, the f1 monitor signal corresponding to the f1 component indicates a positive value at the zero cross point (marked with a black circle ●) where the f2 monitor signal corresponding to the f2 component changes from negative to positive in bias voltage sweeping as illustrated in FIG. 8A. Furthermore, the f1 monitor signal corresponding to the f1 component indicates a negative value at the zero cross point (marked with a black triangle ▲) where the f2 monitor signal corresponding to the f2 component changes from positive to negative in bias voltage sweeping.

When Vd<V$\pi$, the f1 monitor signal corresponding to the f1 component indicates a positive value at the zero cross point (marked with a white circle ○) where the f2 monitor signal corresponding to the f2 component changes from positive to negative in bias voltage sweeping as illustrated in FIG. 8B. Furthermore, the f1 monitor signal corresponding to the f1 component indicates a negative value at the zero cross point (marked with a white triangle Δ) where the f2 monitor signal corresponding to the f2 component changes from negative to positive in bias voltage sweeping.

FIGS. 9A and 9B are tables representing states of monitor signals with respect to bias voltage. FIGS. 9A and 9B illustrate the change of a monitor signal in an area where the f2 component is close to zero. FIG. 9A indicates the signs (positive, negative, or zero) of a monitor signal when the bias voltage is in the vicinity of the optimum voltage. The optimum bias voltage is marked with, for example, a black circle ● in FIG. 8A, and marked with a white circle ○ in FIG. 8B. FIG. 9B illustrates the signs of a monitor signal in the vicinity of the bias voltage obtained at another zero cross point. The bias voltage with which another zero cross point is obtained is marked with, for example, a black triangle ▲ in FIG. 8A and a white triangle Δ in FIG. 8B.

As described above, if the f1 monitor signal and the f2 monitor signal are detected while sweeping the bias voltage, it may be decided whether or not the drive amplitude of the optical modulator 25 is larger than Vπ. That is, the controller 26 may decide the following conditions.

(1) At the bias voltage where the f2 monitor signal corresponding to the f2 component changes from positive to negative, if the f1 monitor signal corresponding to the f1 component indicates a positive value, the drive amplitude is smaller than Vπ.

(2) At the bias voltage where the f2 monitor signal corresponding to the f2 component changes from negative to positive, if the f1 monitor signal corresponding to the f1 component indicates a positive value, the drive amplitude is larger than Vπ.

(3) At the bias voltage where the f2 monitor signal corresponding to the f2 component changes from negative to positive, if the f1 monitor signal corresponding to the f1 component indicates a negative value, the drive amplitude is smaller than Vπ.

(4) At the bias voltage where the f2 monitor signal corresponding to the f2 component changes from positive to negative, if the f1 monitor signal corresponding to the f1 component indicates a negative value, the drive amplitude is larger than Vπ.

Note that the bias voltage where the f2 monitor signal changes from positive to negative includes the voltage in the vicinity of the bias voltage where the f2 monitor signal changes from positive to negative. In addition, the bias voltage where the f2 monitor signal changes from negative to positive includes the voltage in the vicinity of the bias voltage where the f2 monitor signal changes from negative to positive.

Then, the controller 26 determines the control scheme of the bias voltage of the optical modulator 25 based on the result of the decision on the drive amplitude. In this embodiment, when the drive amplitude is larger than Vπ, the controller 26 selects the control scheme 1 above. When the drive amplitude is smaller than Vπ, the controller 26 selects the control scheme 2 above. However, the present invention is not limited to this method. That is, depending on the configuration of the optical transmitter, the control scheme 2 may be selected when the drive amplitude is larger than Vπ, and the control scheme 1 may be selected when the drive amplitude is smaller than Vπ.

When the drive amplitude Vd is Vπ, the controller 26 may be unable to obtain an appropriate monitor signal. For example, when Vd=Vπ, the f2 monitor signal indicating the f2 component is constantly zero while the bias voltage is swept. In this case, the controller 26 may temporarily change the drive amplitude.

Figure 10:
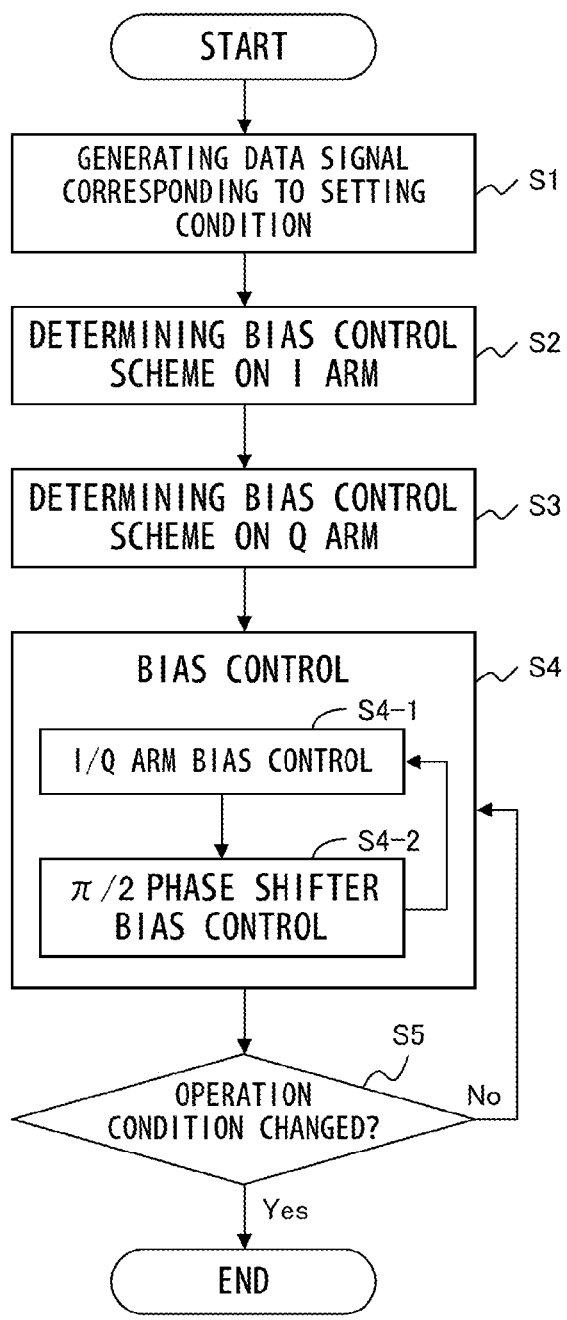
FIG. 10 is a flowchart of a method for controlling an optical modulator.

FIG. 10 is a flowchart of a method for controlling an optical modulator. The process according to the flowchart is performed when the optical transmitter 1 starts the operation. Furthermore, the process according to the flowchart is also performed when the operation condition (modulation format, amount of chromatic dispersion for pre-equalization) of the optical transmitter 1 is changed. The operation condition of the optical transmitter 1 is notified from, for example, the network management system 101.

In S1, the digital signal processor 21 generates data signals I and Q from input data according to a specified condition. The generated data signals I and Q are respectively applied to the I and Q arms of the optical modulator 25 as a drive signal.

In S2, the controller 26 determines the bias control scheme for the I arm. In S3, the controller 26 determines the bias control scheme for the Q arm. The order of performing the processes in S2 and S3 is not limited. That is, the controller 26 may determine the bias control scheme for the I arm after determining the bias control scheme for the Q arm.

In S4, the controller 26 controls the bias of the optical modulator 25. S4 includes S4-1 in which the bias of the I and Q arms is controlled, and S4-2 in which the bias of the phase shifter 25b is controlled. Then, the controller 26 continues the bias control in S4 until the operation condition of the optical transmitter 1 is changed. In this case, for example, the processes in S4-1 and S4-2 are alternately performed.

In S4-1, the controller 26 controls the bias of the I and Q arms. The control schemes are determined in S2 and S3. In S4-2, the controller 26 controls the phase of the phase shifter 25b at π/2. In this case, the controller 26 may control the phase of the phase shifter 25 according to the modulated optical signal generated by the optical modulator 25. Since the method of controlling the phase of the phase shifter 25b may be realized using a well-known technology, the detailed explanation is omitted here.

Figure 11:
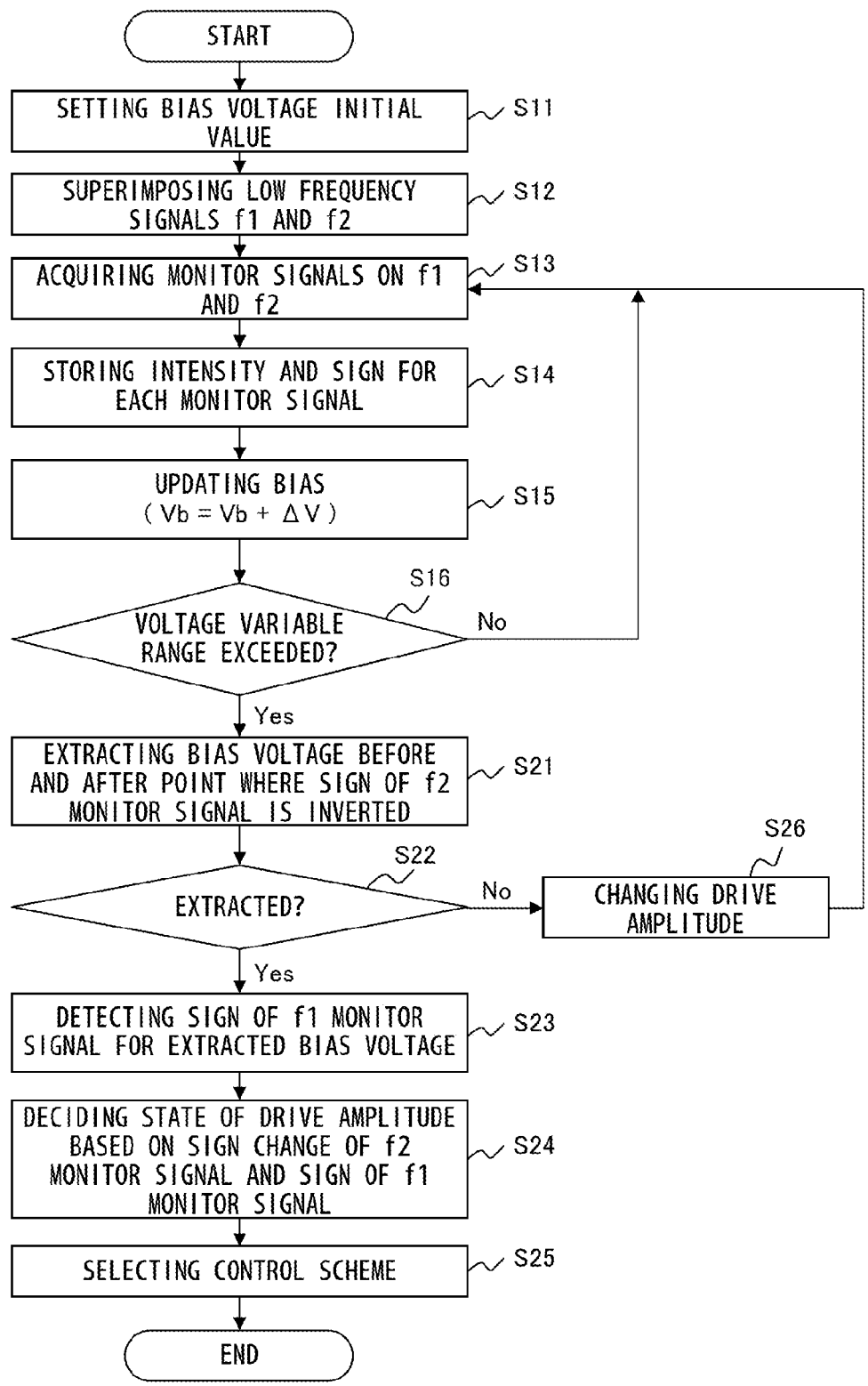
FIG. 11 is a flowchart of a process for determining a bias control scheme.

FIG. 11 is a flowchart of the process of determining the bias control scheme. The process according to the flowchart corresponds to S2 and S3 in FIG. 10. That is, the controller 26 performs the flowchart illustrated in FIG. 11 as S2, and also performs the flowchart illustrated in FIG. 11 as S3. Described below is the case in which the control scheme is determined for the I arm. The procedure of determining the control scheme for the Q arm is the substantially same as the procedure of determining the control scheme for the I arm.

In S11, the controller 26 sets the initial value of the bias voltage. The initial value is not restricted, but may be zero. In S12, the controller 26 superimposes the low frequency signal f1 on the drive signal (data signal I in this example). The controller 26 also superimposes the low frequency signal f2 on the bias voltage of the I arm.

In S13 through S16, the controller 26 stores the values of the f1 monitor signal and the f2 monitor signal while sweeping the bias voltage of the I arm. That is, in S13, the controller 26 acquires the f1 monitor signal corresponding to the f1 component and the f2 monitor signal corresponding to the f2 component. The f1 monitor signal and the f2 monitor signal are generated by the detector 28. In S14, the controller 26 stores the intensity and sign of the f1 component expressed by the f1 monitor signal and the intensity and sign of the f2 component expressed by the f2 monitor signal in monitor signal data memory in association with the current bias voltage. The intensity indicates the power or amplitude of the f1 component and f2 component extracted from the modulated optical signal. The sign corresponds to the phases of the f1 component and the f2 component, and is expressed by positive or negative. The monitor signal data memory is included in, for example, the controller 26.

In S15, the controller 26 updates the bias voltage Vb of the I arm. That is, Vb=Vb+ΔV is executed. It is assumed that ΔV is sufficiently small with respect to Vπ of the optical modulator 25. In the embodiment, it is also assumed that ΔV is a positive value. Thus, the bias voltage gradually increases by repeatedly performing the processes in S13 through S16. In S16, the controller 26 decides whether or not the bias voltage Vb has exceeded the sweeping range. It is assumed that the sweeping range is specified in advance. In the examples illustrated in FIGS. 8A and 8B, the sweeping range is 3 Vπ.

When the bias voltage exceeds the sweeping range (YES in S16), the process of the controller 26 is moved to S21. Unless the bias voltage exceeds the sweeping range (NO in S16), the process of the controller 26 is returned to S13. That is, the controller 26 repeatedly performs the processes in S13 through S16 until it collects the data of the f1 monitor signal and the f2 monitor signal over the sweeping range.

In S21, the controller 26 refers to the monitor signal data memory, and extracts the bias voltage data before and after the point where the sign of the f2 monitor signal corresponding to the f2 component changes. Assume that the data illustrated in FIG. 12 is stored in the monitor signal data memory. In the example illustrated in FIG. 12, when the bias voltage Vb increases from 0.50 to 0.55, the sign of the f2 monitor signal corresponding to the f2 component changes from negative to positive. Therefore, in this case, a set of bias voltages Vb1=0.50 and Vb2=0.55 is obtained.

In S22, the controller 26 decides whether or not appropriate bias voltage data has been acquired in S21. If the bias voltage data has been acquired (YES in S22), then the controller 26 performs the processes in S23 through S25. Unless the bias voltage data has been acquired (NO in S22), the controller 26 performs the process in S26.

In S23, the controller 26 refers to the monitor signal data memory, and detects the sign of the f1 monitor signal corresponding to the bias voltage data acquired in S21. In the example in FIG. 12, +0.99 and +0.98 are stored for a set of bias voltages Vb1=0.50 and Vb2=0.55, respectively. Therefore, in this case, "positive" and "positive" are obtained.

In S24, the controller 26 decides the state of the drive amplitude Vd based on the change direction of the sign of the f2 monitor signal and the sign of the f1 monitor signal. In the example above, the sign of the f2 monitor signal changes from negative to positive. In addition, the sign of the f1 monitor signal is positive. In this case, it is decided that the drive amplitude Vd is $V\pi < Vd < 2V\pi$ as illustrated in FIG. 9A.

In this embodiment, the state of the drive amplitude is decided according to the sign of the f1 monitor signal obtained at two points near the bias voltage where the f2 monitor signal indicates zero. However, $\Delta V$ in S15 (that is, the step of sweeping the bias voltage) is sufficiently small with respect to $V\pi$ of the optical modulator 25. Therefore, it can be said that the state of the drive amplitude is decided substantially based on the sign of the f1 monitor signal at the bias voltage where the f2 monitor signal indicates zero.

In S25, the controller 26 determines the bias control scheme based on the state of the drive amplitude Vd. In the embodiment, the controller 26 selects one of the above-mentioned control schemes 1 and 2. For example, when $V\pi < Vd < 2V\pi$, the controller 26 selects the above-mentioned control scheme 1.

Figure 2A:
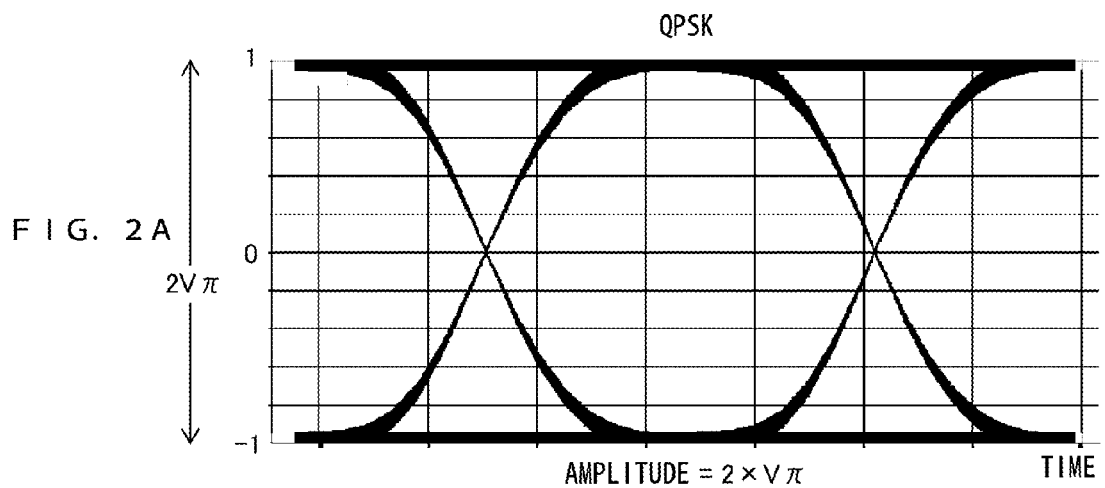
FIGS. 2A-2C illustrate examples of a waveform of a drive signal applied to an optical modulator.
Figure 2B:
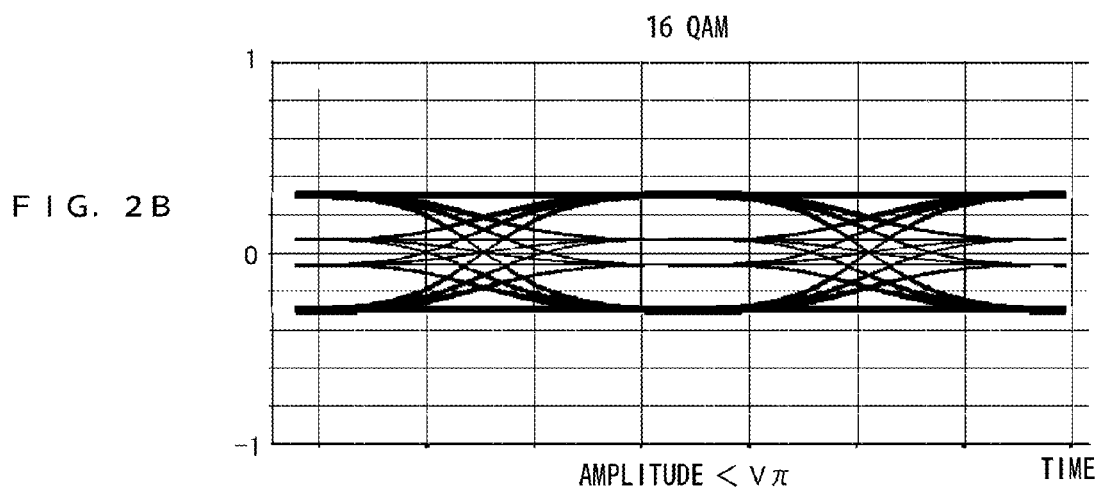
Figure 2C:
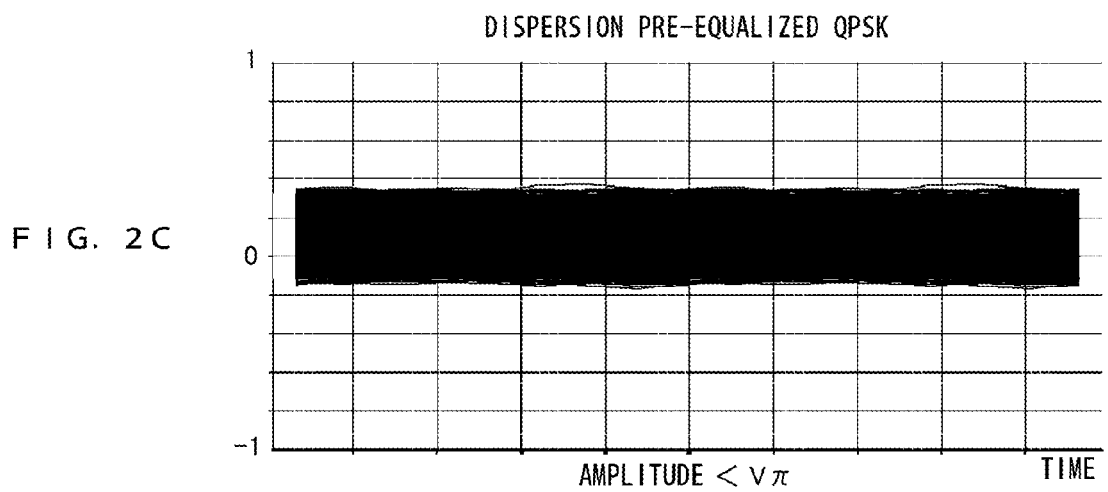

S26 is performed, for example, when Vd=$V\pi$. In S26, the controller 26 changes the amplitude of the drive signal. For example, the controller 26 may change the amplitude of the drive signal by adjusting the gain control signal provided for the amplifier 23i. Furthermore, the controller 26 may instruct the digital signal processor 21 to change the parameter for use in pre-equalization. The parameter to be updated is, for example, the amount of chromatic dispersion or the amount of nonlinear compensation. In this case, the digital signal processor 21 generates a drive signal according to the instruction received from the controller 26. For example, FIG. 2A illustrates the waveform of the drive signal for QPSK modulation without pre-equalization, and FIG. 2C illustrates the waveform of the drive signal for QPSK modulation with pre-equalization.

After the drive amplitude is changed in S26, the process of the controller 26 is returned to S13. Then, the controller 26 performs the processes in S13 through S16 and S21 through S25. In this case, since Vd is not $V\pi$, the controller 26 may determine the control scheme according to the monitor signal.

FIG. 13 is a flowchart of the process for controlling the bias voltage of the optical modulator 25. The process according to the flowchart corresponds to S4-1 in FIG. 10. Therefore, before performing the process according to the flowchart, the controller 26 decides the state of the drive amplitude.

Described below is the case in which the bias voltage of the I arm is controlled. The bias control of the Q arm is substantially the same as the bias control of the I arm.

In S31, the controller 26 decides whether or not the drive amplitude Vd is larger than $V\pi$. If Vd>$V\pi$, the controller 26 selects the control scheme 1, and performs the processes in S32 through S35. If Vd<$V\pi$, the controller 26 selects the control scheme 2, and performs the processes in S36 through S39. When the controller 26 performs the processes in S32 through S35 or S36 through S39, a specified low frequency signal (for example, the low frequency signal f2) is superimposed on the bias voltage of the I arm.

In S32, the controller 26 decides whether or not the f2 component included in the modulated optical signal is zero. The intensity and phase of the f2 component is detected by synchronous detection by the detector 28 as described above. Assume that "f2 component is zero" includes the state in which the f2 component is sufficiently small (that is, almost zero).

Unless the f2 component is zero, the controller 26 decides in S33 whether or not the f2 component is in phase with the reference low frequency signal f2. If the f2 component is in phase with the reference low frequency signal f2, the controller 26 decides that the current bias voltage Vb is lower than the optimum bias voltage. Therefore, in this case, the controller 26 increases the bias voltage Vb by $\Delta V$ in S34. On the other hand, if the f2 component is reversed phase of the reference low frequency signal f2, the controller 26 decides that the current bias voltage Vb is higher than the optimum bias voltage. Therefore, in this case, the controller 26 reduces the bias voltage Vb by $\Delta V$ in S35.

S36 and S37 are substantially the same as S32 and S33. That is, when the f2 component is not zero, the controller 26 decides whether or not the f2 component is in phase with the reference low frequency signal f2. However, S38 and S39 are different from S34 and S35.

If the f2 component is in phase with the reference low frequency signal f2, the controller 26 decides that the current bias voltage Vb is higher than the optimum bias voltage. Therefore, in this case, the controller 26 reduces the bias voltage Vb by $\Delta V$ in S38. On the other hand, if the f2 component is reversed phase of the reference low frequency signal f2, then the controller 26 decides that the current bias voltage Vb is lower than the optimum bias voltage. Therefore, in this case, the controller 26 increases the bias voltage Vb by $\Delta V$ in S39.

If the f2 component is zero in the control schemes 1 and 2, the controller 26 decides that the current bias voltage Vb is the optimum. Therefore, in this case, the controller 26 terminates the control of the bias voltage.

As described above, the optical transmitter 1 according to the embodiment of the present invention detects the state of the amplitude of the drive signal of the optical modulator 25 by monitoring the modulated optical signal. Then, the optical transmitter 1 determines the control scheme for controlling the bias voltage of the optical modulator depending on the amplitude of the drive signal. Therefore, even when the amplitude of the drive signal is changed by the change of a modulation format etc and so on, the bias voltage of the optical modulator 25 is appropriately controlled.

In the example illustrated in FIG. 13, although the control scheme 1 is selected when the drive amplitude is larger than $V\pi$, and the control scheme 2 is selected when the drive amplitude is smaller than $V\pi$, the present invention is not limited to this application. That is, depending on the configuration of the optical transmitter, the control scheme 2 may be selected when the drive amplitude is larger than Vπ, and the control scheme 1 may be selected when the drive amplitude is smaller than Vπ.

Other Embodiments

In the embodiment described with reference to FIGS. 8A through 9B, the state of the drive amplitude is decided based on the sign (positive or negative) of the f1 component at the bias voltage where the intensity of the f2 component is zero. However, the present invention is not limited to this method. For example, using the product of the f1 monitor signal corresponding to the f1 component and the f2 monitor signal corresponding to the f2 component, the state of the drive amplitude may be decided. In this case, the state of the drive amplitude is decided as follows (refer to FIGS. 14A and 14B).

At the zero cross points (symbol of a black circle ● illustrated in FIG. 8A, and symbol of a white triangle Δ illustrated in FIG. 8B) where the f2 monitor signal corresponding to the f2 component changes from negative to positive in the bias voltage sweeping, a decision is made as follows. Note that the sign (positive or negative) of the product of the f1 monitor signal and the f2 monitor signal is denoted by "f1*f2".
(1) When the sign of f1*f2 changes from negative to positive, it is decided that Vπ<Vd<2Vπ.
(2) When the sign of f1*f2 changes from positive to negative, it is decided that Vd<Vπ.

On the other hand, at the zero cross points (symbol of a black triangle ♦ illustrated in FIG. 8A, and symbol of a white circle ○ illustrated in FIG. 8B) where the f2 monitor signal corresponding to the f2 component changes from positive to negative in the bias voltage sweeping, a decision is made as follows.
(1) When the sign of f1*f2 changes from negative to positive, it is decided that Vπ<Vd<2Vπ.
(2) When the sign of f1*f2 changes from positive to negative, it is decided that Vd<Vπ.

In the embodiment described with reference to FIGS. 8A through 9B, the state of the drive amplitude is decided based on the sign (positive or negative) of the f1 component at the bias voltage where the intensity of the f2 component is zero. However, the state of the drive amplitude may be decided based on the sign (positive or negative) of the f2 component at the bias voltage where the intensity of the f1 component indicates zero.

For example, in FIGS. 8A and 8B, the zero cross point where the f1 monitor signal indicating the f1 component changes from negative to positive is regarded. In this case, as illustrated in FIG. 8A, if the f2 monitor signal indicating the f2 component is negative, it is decided that the drive amplitude is larger than Vπ. Furthermore, as illustrated in FIG. 8B, if the f2 monitor signal indicating the f2 component is positive, it is decided that the drive amplitude is smaller than Vπ.

In the embodiment illustrated in FIGS. 6 and 7, the low frequency signal f1 is superimposed on the drive signal, and the low frequency signal f2 is superimposed on the bias voltage. That is, using low frequency signals of different frequencies, the controller 26 may simultaneously acquire the f1 monitor signal and the f2 monitor signal. However, the present invention is not limited to this configuration. That is, the optical transmitter 1 may perform the operation of acquiring a monitor signal by superimposing a low frequency signal on a drive signal, and the operation of acquiring a monitor signal by superimposing a low frequency signal on a bias voltage at different timing. In this case, the frequency of the low frequency signal superimposed on the drive signal and the frequency of the low frequency signal superimposed on the bias voltage may be the same with each other.

Figure 15:
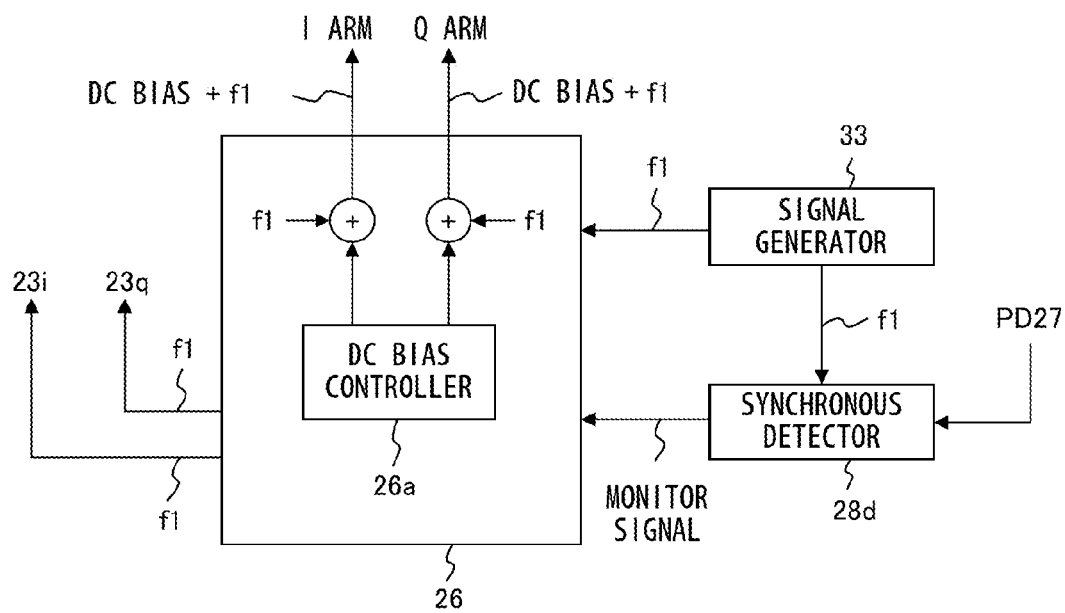
FIG. 15 illustrates a configuration of a controller and a detector used in a case in which two monitor signals are acquired at different time points.

FIG. 15 illustrates a configuration of the controller 26 and the detector 28 used in a case in which two monitor signals are acquired at different timing. In this case, the controller 26 uses a low frequency signal generated by a signal generator 33. It is assumed that the signal generator 33 generates a low frequency signal f1. When acquiring a monitor signal corresponding to the f1 monitor signal, the controller 26 provides a low frequency signal for the amplifier 23i (23q). Thus, the low frequency signal is superimposed on the drive signal. When acquiring a monitor signal corresponding to the f2 monitor signal as illustrated in FIGS. 6 and 7, the controller 26 superimposes the low frequency signal on the bias voltage.

The detector 28 includes a synchronous detector 28d. The synchronous detector 28d detects the intensity and phase of the low frequency component included in the modulated optical signal using the low frequency signal generated by the signal generator 33. When the low frequency signal is superimposed on the drive signal, the synchronous detector 28d outputs a monitor signal corresponding to the f1 monitor signal. When a low frequency signal is superimposed on the bias voltage, the synchronous detector 28d outputs a monitor signal corresponding to the f2 monitor signal as illustrated in FIGS. 6 and 7.

FIG. 16 illustrates a configuration that can simultaneously determine the control schemes of I and Q arms. The configuration of the optical transmitter illustrated in FIG. 16 is substantially the same as the configuration illustrated in FIG. 6. However, in the optical transmitter in FIG. 16, four low frequency signals f1 through F4 having different frequencies are used. In this case, the low frequency signal f1 is provided for the amplifier 23i, and the low frequency signal f1 is superimposed on the drive signal (data signal I). The low frequency signal f2 is superimposed on the I arm bias voltage. The low frequency signal f3 is provided for the amplifier 23q, and the low frequency signal f3 is superimposed on the drive signal (data signal Q). The low frequency signal f4 is superimposed on the Q arm bias voltage.

When determining the control scheme, the controller 26 simultaneously sweeps the I arm bias voltage and the Q arm bias voltage. The I and Q arms may use the same sweeping speed and sweeping range.

The detector 28 includes four synchronous detectors for respectively detecting the intensity and phases of the f1 through f4 components included in the modulated optical signal. The four synchronous detectors outputs a monitor signal indicating the intensity and phases of the f1 through f4 components. The controller 26 determines the control scheme of the I arm bias according to the monitor signal indicating the f1 component and the monitor signal indicating the f2 component. Similarly, the controller 26 determines the control scheme of the Q arm bias according to the monitor signal indicating the f3 component and the monitor signal indicating the f4 component.

Figure 17A:
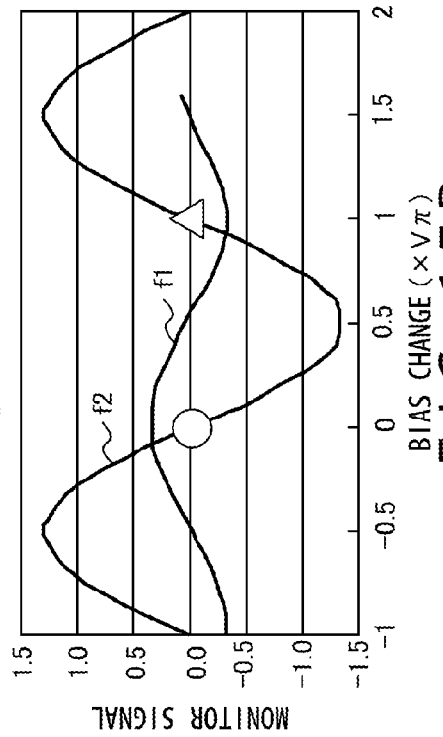
FIGS. 17A-17D illustrate a monitor signal detected with respect to bias voltage in the configuration illustrated in FIG. 16.
Figure 17B:
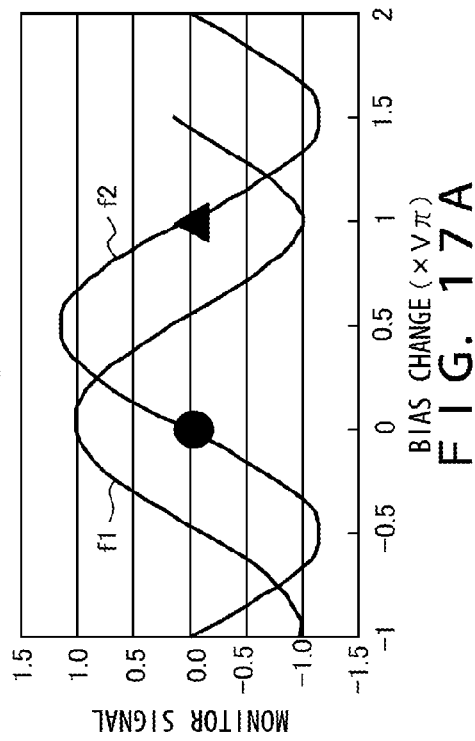

FIGS. 17A-17D illustrate a monitor signal detected while sweeping a bias voltage in the configuration illustrated in FIG. 16. From the I arm side, a set of monitor signals illustrated in FIG. 17A or 17B is acquired depending on the amplitude of the drive signal on the I arm side. A set of monitor signals illustrated in FIGS. 17A and 17B is substantially the same as a set of monitor signals illustrates in FIGS. 8A and 8B. Therefore, it is decided whether or not the drive amplitude on the I arm side is larger than Vπ according to the monitor signal indicating the f1 component and the monitor signal indicating the f2 component.

Figure 17C:
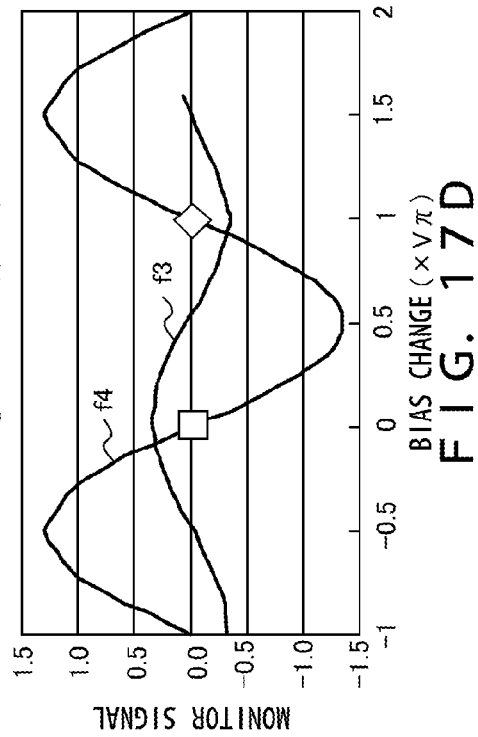
Figure 17D:
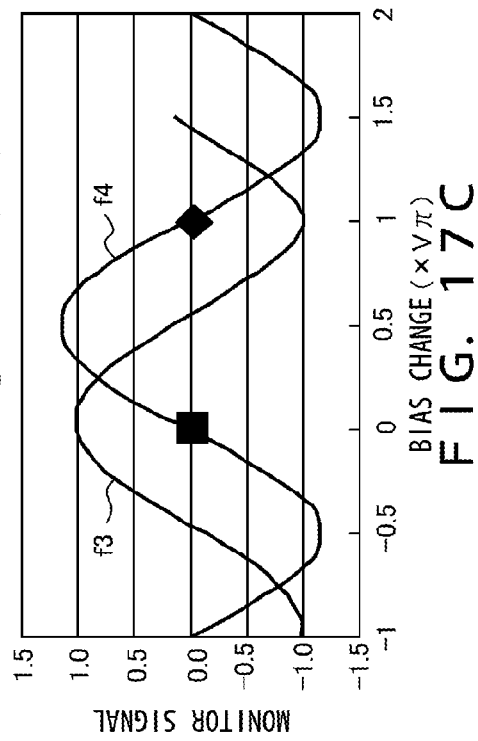

Similarly, from the Q arm side, a set of monitor signals illustrated in FIG. 17C or 17D is acquired depending on the amplitude of the drive signal on the Q arm side. A set of monitor signals illustrated in FIGS. 17C and 17D is also substantially the same as a set of monitor signals illustrates in FIGS. 8A and 8B. Therefore, it is decided whether or not the drive amplitude on the Q arm side is larger than Vπ according to the monitor signal indicating the f3 component and the monitor signal indicating the f4 component.

Figure 18:
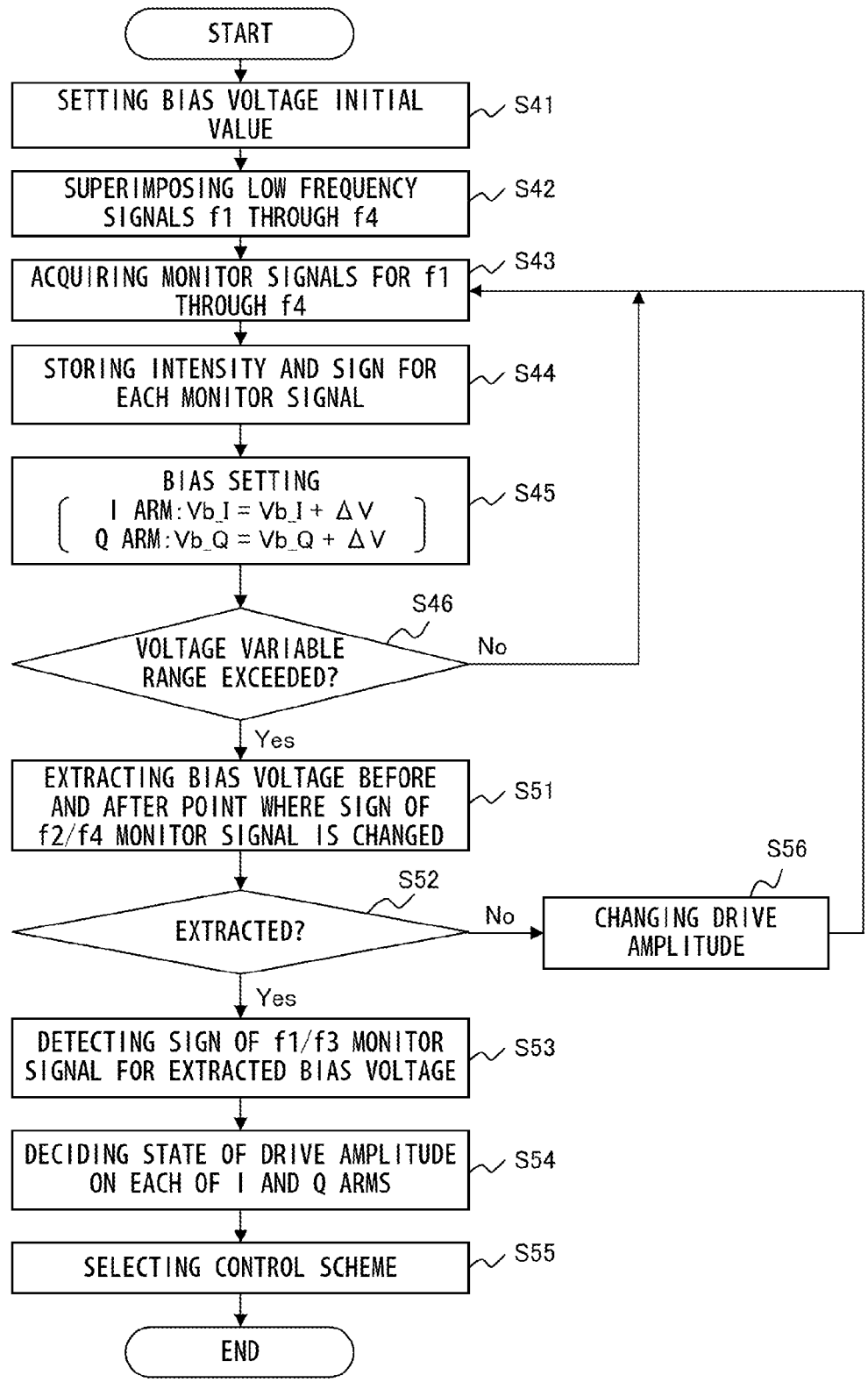
FIG. 18 is a flowchart of a process for determining a bias control scheme in the configuration illustrated in FIG. 16.

FIG. 18 is a flowchart of the process for determining a bias control scheme in the configuration illustrated in FIG. 16. S41-S46 and S51-S56 in FIG. 18 correspond to S11-S16 and S21-S26 in FIG. 11, respectively. Therefore, in the explanation below, the difference from the process in the flowchart in FIG. 11 is described.

In S41, the controller 26 sets initial values of the I arm bias voltage and the Q arm bias voltage. In S42, the controller 26 superimposes the low frequency signal f1 on the I arm drive signal, the low frequency signal f3 on the Q arm drive signal, the low frequency signal f2 on the I arm bias voltage, and the low frequency signal f4 on the Q arm bias voltage. In S43 through S46, the controller 26 detects the intensity and phases of the f1 through f4 components while sweeping the I arm bias voltage and the Q arm bias voltage. The information detected with respect to the f1 through f4 components is stored as monitor signal data in the monitor signal data memory.

In S51 and S52, the controller 26 refers to the monitor signal data memory, and extracts the bias voltage data before and after the point where the sign of the monitor signal indicating the f2 and f4 components changes. In S53, the controller 26 refers to the monitor signal data memory, and searches for the sign of the monitor signal indicating the f1 and f3 components corresponding to the bias voltage data extracted in S51. In S54, the controller 26 decides the state of the drive amplitude of the I arm based on the change of the sign in the f2 component and the sign of the f1 component. The controller 26 also decides the state of the drive amplitude of the Q arm based on the change of the sign in the f4 component and the sign of the f3 component. Thus, according to the configuration illustrated in FIG. 16, the states of the drive amplitudes of the I arm and the Q arm are simultaneously decided.

In the embodiment illustrated in FIGS. 6 through 18, it is decided whether or not the amplitude of the drive signal of the optical modulator is larger than Vπ. However, the present invention is not limited to this decision. That is, the present invention may be applied to the configuration and the method of deciding whether or not the amplitude of the drive signal of the optical modulator is larger than a specified threshold.

In addition, in the embodiment illustrated in FIGS. 6 through 18, the state of the drive signal is decided on each of the I and Q arms, but the present invention is not limited to this judgment. For example, when the operation conditions of the I and Q arms are the same each other, the bias control scheme is determined on one of the I and Q arms, and the bias voltage of the I and Q arms may be controlled by the determined control scheme.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
   a drive signal generator configured to generate a drive signal from input data;
   an optical modulator configured to generate an optical signal corresponding to the drive signal, intensity of output light of the optical modulator periodically changing with respect to an applied voltage;
   a reference signal generator configured to generate a first reference signal of a first frequency and a second reference signal of a second frequency, the first frequency and the second frequency being different from each other;
   a superimposer configured to superimpose the first reference signal on the drive signal and superimpose the second reference signal on a bias voltage of the optical modulator;
   a converter configured to convert the optical signal into an electric signal;
   a detector configured to detect an intensity and a phase of the first reference signal included in the optical signal from the electric signal with a synchronous detection using the first reference signal generated by the reference signal generator and an intensity and a phase of the second reference signal included in the optical signal from the electric signal with a synchronous detection using the second reference signal generated by the reference signal generator, and generate a first monitor signal indicating the detected intensity and phase of the first reference signal and a second monitor signal indicating the detected intensity and phase of the second reference signal; and
   a controller configured to control the bias voltage of the optical modulator in a control scheme determined based on the first monitor signal and the second monitor signal.

2. The optical transmitter according to claim 1, wherein the controller determines the control scheme for controlling the bias voltage based on the phase indicated by the first monitor signal at the bias voltage where the phase indicated by the second monitor signal changes.

3. The optical transmitter according to claim 1, wherein the controller decides whether or not an amplitude of the drive signal is larger than a threshold based on a phase indicated by the first monitor signal at a bias voltage where the phase indicated by the second monitor signal changes, and determines the control scheme for controlling the bias voltage based on a result of the decision.

4. The optical transmitter according to claim 1, wherein when the second monitor signal does not change in sweeping the bias voltage, the controller determines the control scheme for controlling the bias voltage based on the first and second monitor signals after changing an amplitude of the drive signal.

5. The optical transmitter according to claim 1, wherein the controller determines the control scheme for controlling the bias voltage based on a product of the first and second monitor signals at a bias voltage where a phase indicated by the second monitor signal changes.

6. The optical transmitter according to claim 1, wherein the controller determines the control scheme for controlling the bias voltage based on a phase indicated by the second monitor signal at a bias voltage where a phase indicated by the first monitor signal changes.

7. The optical transmitter according to claim 1, wherein:
   the optical modulator includes I and Q arms;
   the drive signal generator generates I and Q arm drive signals;

the controller performs a process of determining the control scheme for controlling a bias voltage for an I arm, and a process of determining the control scheme for controlling a bias voltage for a Q arm at different time points.

8. The optical transmitter according to claim 1, wherein:
the optical modulator includes I and Q arms;
the drive signal generator generates I and Q arm drive signals;
a reference signal superimposed on the I arm drive signal, a reference signal superimposed on a bias voltage of the I arm, a reference signal superimposed on the Q arm drive signal, and a reference signal superimposed on a bias voltage of the Q arm are different in frequency; and
the controller performs in parallel a process of determining a control scheme for controlling a bias voltage on an I arm, and a process of determining a control scheme for controlling a bias voltage on a Q arm.

9. An optical transmitter comprising:
a drive signal generator configured to generate a drive signal from input data;
an optical modulator configured to generate an optical signal corresponding to the drive signal, intensity of output light of the optical modulator periodically changing with respect to an applied voltage;
a superimposer configured to superimpose a first reference signal on the drive signal and superimpose a second reference signal on a bias voltage of the optical modulator;
a detector configured to detect the first reference signal and the second reference signal included in the optical signal, and generate a first monitor signal indicating intensity and a phase of the detected first reference signal and a second monitor signal indicating intensity and a phase of the detected second reference signal; and
a controller configured to control the bias voltage of the optical modulator in a control scheme determined based on the first monitor signal and the second monitor signal, wherein
the controller specifies a bias voltage at which a phase of the second monitor signal changes from a state in which the second monitor signal is in phase with the second reference signal to a state in which the second monitor signal is reversed phase of the second reference signal, and determines the control scheme for controlling the bias voltage according to whether the first monitor signal at the specified bias voltage is in phase with the first reference signal or reversed phase of the first reference signal.

10. An optical transmitter comprising:
a drive signal generator configured to generate a drive signal from input data;
an optical modulator configured to generate an optical signal corresponding to the drive signal, intensity of output light of the optical modulator periodically changing with respect to an applied voltage;
a superimposer configured to superimpose a first reference signal on the drive signal and superimpose a second reference signal on a bias voltage of the optical modulator;
a detector configured to detect the first reference signal and the second reference signal included in the optical signal, and generate a first monitor signal indicating intensity and a phase of the detected first reference signal and a second monitor signal indicating intensity and a phase of the detected second reference signal; and a controller configured to control the bias voltage of the optical modulator in a control scheme determined based on the first monitor signal and the second monitor signal, wherein
the controller specifies a bias voltage at which a phase of the second monitor signal changes from a state in which the second monitor signal is reversed phase of the second reference signal to a state in which the second monitor signal is in phase with the second reference signal, and determines the control scheme for controlling the bias voltage according to whether the first monitor signal at the specified bias voltage is in phase with the first reference signal or reversed phase of the first reference signal.

11. An optical transmitter comprising:
a drive signal generator configured to generate a drive signal from input data;
an optical modulator configured to generate an optical signal corresponding to the drive signal, intensity of output light of the optical modulator periodically changing with respect to an applied voltage;
a superimposer configured to superimpose a first reference signal on the drive signal and superimpose a second reference signal on a bias voltage of the optical modulator;
a detector configured to detect the first reference signal and the second reference signal included in the optical signal, and generate a first monitor signal indicating intensity and a phase of the detected first reference signal and a second monitor signal indicating intensity and a phase of the detected second reference signal; and
a controller configured to control the bias voltage of the optical modulator in a control scheme determined based on the first monitor signal and the second monitor signal, wherein
the controller is capable of performing a first control scheme in which the bias voltage is increased when the second reference signal is in phase with a frequency component of the second reference signal detected from the optical signal and the bias voltage is reduced when the second reference signal is reversed phase of a frequency component of the second reference signal detected from the optical signal, and is capable of performing a second control scheme in which the bias voltage is reduced when the second reference signal is in phase with a frequency component of the second reference signal detected from the optical signal and the bias voltage is increased when the second reference signal is reversed phase of a frequency component of the second reference signal detected from the optical signal; and
the controller selects one of the first and second control schemes according to the first and second monitor signals.

12. A bias control method of controlling a bias of an optical modulator which has characteristics where intensity of output light periodically changes with respect to an applied voltage, the method comprising:
generating, by using a reference signal generator, a first reference signal of a first frequency and a second reference signal of a second frequency, the first frequency and the second frequency being different from each other;
superimposing the first reference signal on a drive signal generated from input data;
superimposing the second reference signal on a bias voltage of the optical modulator;
converting an optical signal generated by the optical modulator into an electric signal;

detecting an intensity and a phase of the first reference signal included in the optical signal from the electric signal with a synchronous detection using the first reference signal generated by the reference signal generator;

detecting an intensity and a phase of the second reference signal included in the optical signal from the electric signal with a synchronous detection using the second reference signal generated by the reference signal generator;

generating a first monitor signal indicating the detected intensity and phase of the first reference signal and a second monitor signal indicating the detected intensity and phase of the second reference signal; and controlling a bias voltage of the optical modulator in a control scheme determined based on the first and second monitor signals.

* * * * *